United States Patent [19]
Salamon

[11] Patent Number: 6,011,566
[45] Date of Patent: Jan. 4, 2000

[54] SYSTEM AND METHOD TO DISPLAY RASTER IMAGES WITH NEGLIGIBLE DELAY TIME AND REDUCED MEMORY REQUIREMENTS

[75] Inventor: Ted R. Salamon, Huntsville, Ala.

[73] Assignee: Unisys Corporation, BlueBell, Pa.

[21] Appl. No.: 08/847,768

[22] Filed: Apr. 22, 1997

Related U.S. Application Data

[63] Continuation of application No. 08/299,866, Sep. 1, 1994, abandoned.

[51] Int. Cl.[7] ....................................................... G09G 5/00
[52] U.S. Cl. ............................................. 345/517; 345/203
[58] Field of Search .................................... 345/131, 515, 345/517, 127, 203

[56] References Cited

U.S. PATENT DOCUMENTS

| | | | |
|---|---|---|---|
| 4,612,540 | 9/1986 | Pratt | 340/793 |
| 4,616,217 | 10/1986 | Nesbitt et al. . | |
| 4,783,834 | 11/1988 | Anderson et al. | 345/126 |
| 4,897,795 | 1/1990 | Yoda et al. . | |
| 5,091,721 | 2/1992 | Hamori | 345/126 |
| 5,263,136 | 11/1993 | DeAguiar et al. | 345/511 |
| 5,363,119 | 11/1994 | Snyder et al. | 345/131 |
| 5,440,346 | 8/1995 | Alattar et al. | 348/420 |
| 5,452,235 | 9/1995 | Isani | 345/202 |
| 5,457,776 | 10/1995 | Wong et al. | 345/202 |
| 5,485,600 | 1/1996 | Joseph et al. | 364/190 |
| 5,490,237 | 2/1996 | Zimmerman et al. . | |
| 5,502,576 | 3/1996 | Ramsay et al. | 358/444 |

Primary Examiner—Amare Mengistu
Attorney, Agent, or Firm—John B. Sowell; Mark T. Starr; Steven B. Samuels

[57] ABSTRACT

The present invention is directed to a general purpose raster image system. The present invention performs transformations on an original raster image, and optimizes the raster image decoding and display techniques, to dramatically increase the display performance capabilities by a factor of up to fifteen times the performance provided by previous raster devices. The present invention employs two primary enhanced display features to produce fast raster image decode and display results: (1) data reduction and transformations and (2) optimized algorithmic implementations. Data reduction and transformations operate as follows: a raster image is divided into strips, which are processed individually. A feature of the optimized algorithmic implementation is to increase processing thruput of the display process by optimizing the use of available resources required to decode and display the raster images. In one embodiment, scaling operations are converted from calculation based algorithms, to data lookup tables indexed by the position of the raster image data in the original scan line. Raster image decoding algorithms are changed from iterative conditional loops to redundant code segments individually tailored for specific occurrences of raster image data. Additionally implementation of assembly language in time critical sections of display procedures allocates CPU register resources more efficiently and significantly increases performance.

15 Claims, 33 Drawing Sheets

IMAGE DATA STRUCTURE

502

510 — INPUT PARAMETERS
- 511 — FILE NAME
- 512 — INVERSE IMAGE COLORS FLAG
- 513 — INVERSE DISPLAY COLORS FLAG
- 514 — ROTATION ANGLE
- 515 — MIRROR FLAG
- 516 — DITHER ALLOWED FLAG
- 517 — DISPLAY STRIP SIZE
- 518 — SCALING TYPE FLAG

520 — OPTIONAL INPUT PARAMETERS
- 521 — PICK AREA COORDINATES
- 522 — DISPLAY AREA COORDINATES

530 — IMAGE PARAMETERS
- 531 — FORMAT
- 532 — WIDTH (OR PIXELS PER ROW)
- 533 — HEIGHT (NUMBER OF ROWS)
- 534 — BITS PER PIXEL
- 535 — BIT PLANES
- 536 — PALETTE SIZE
- 537 — PALETTE BUFFER

540 — DISPLAY PARAMETERS
- 541 — DISPLAY BITS PER PIXEL
- 542 — DISPLAY BIT PLANES
- 543 — DISPLAY PALETTE SIZE
- 544 — DISPLAY PALETTE BUFFER

550 — PROCESS FLOW PARAMETERS
- 551 — DITHER REQUIRED FLAG
- 552 — IMAGE STRIP SIZE
- 553 — ROW NUMBER
- 554 — DISPLAY ROW NUMBER
- 555 — DATA FILE OFFSET
- 556 — NUMBER OF STRIPS
- 557 — IMAGE COLOR BITS
- 558 — DISPLAY COLOR BITS
- 559 — DISPLAY STRIP ROW NUMBER

560 — WORK BUFFERS
- 561 — DATA FILE BUFFER
- 562 — DISPLAY STRIP BUFFER
- 563 — IMAGE ROW BUFFER
- 564 — TEMP STORAGE BUFFER
- 565 — DISPLAY ROW BUFFER
- 566 — COLOR MAP BUFFER
- 567 — SCALING MAPS BUFFER
- 568 — DITHER BUFFERS
- 569 — ROTATE BUFFER

FIGURE 5

COLOR BITS PER PIXEL

| ACTUAL COLOR BITS PER PIXEL | COLOR BITS PER PIXEL |
|---|---|
| 1 BIT | 1 BIT |
| 2 - 8 BITS | 8 BIT |
| 9 - 24 BITS | 24 BIT |

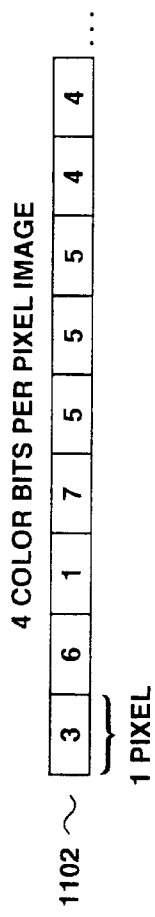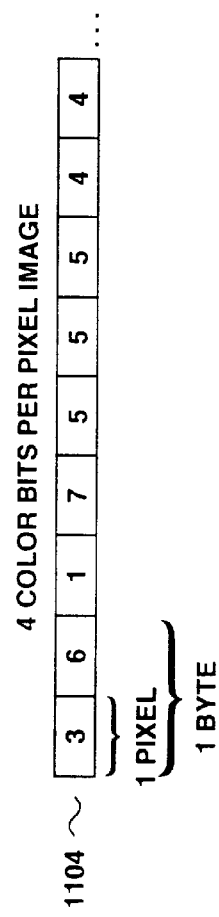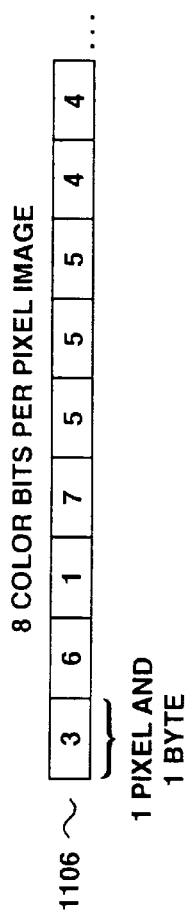
FIGURE 11

WORK BUFFERS 560

1202 — IMAGE DATA FILE BUFFER = PREDEFINED CONSTANT BUFFER SIZE

1204 — DISPLAY STRIP BUFFER = $\dfrac{M_{DISPLAY} * B_{DISPLAY} + 7}{8} * T_{DISPLAY}$ 1206 — IMAGE ROW BUFFER = $\max\left(\dfrac{M_{IMAGE} * B_{IMAGE} + 7}{8}, (M_{IMAGE} + 3) * 2\right)$ 1208 — DISPLAY ROW BUFFER = $\dfrac{M_{DISPLAY} * B_{DISPLAY} + 7}{8}$ 1210 — TEMPORARY STORAGE BUFFER = $\max\left(\dfrac{\max(M_{IMAGE} * B_{IMAGE}, M_{DISPLAY} * B_{DISPLAY}) + 7}{8}, (M_{IMAGE} + 3) * 2\right)$ 1212 — ROTATE BUFFER (FOR ROTATIONS 90 AND 270 ONLY) = $\dfrac{T_{DISPLAY} * B_{DISPLAY} + 7}{8} * M_{DISPLAY}$

1214 — DITHER BUFFERS = $M_{DISPLAY} * 6$

1216 — COLOR MAP BUFFER = $P_{IMAGE}$

1218 — SCALING MAPS BUFFER = $(M_{IMAGE} + M_{DISPLAY} + 2) * 2$

DEFINITIONS:

$M_{IMAGE}$ = PIXELS PER IMAGE ROW
$N_{IMAGE}$ = IMAGE ROWS PER IMAGE
$B_{IMAGE}$ = COLOR BITS PER IMAGE PIXEL
$P_{IMAGE}$ = # IMAGE COLOR PALETTE ENTRIES
$M_{IMAGE}$ = PIXELS PER DISPLAY ROW
$N_{IMAGE}$ = DISPLAY ROWS PER DISPLAY IMAGE
$B_{IMAGE}$ = COLOR BITS PER DISPLAY IMAGE PIXEL
$T_{IMAGE}$ = ROWS PER DISPLAY STRIP

FIGURE 12

SCALING MAP GENERATION

IMAGE SCALING MAP

1302 — | M(0) | M(1) | M(2) | ... | M(M$_{IMAGE}$ - 2) | M(M$_{IMAGE}$ - 1) | M(M$_{IMAGE}$) |

IMAGE SCALING MAP FUNCTION

1304 —
$$M(X) = \begin{cases} 0 & : X < X_{PICK\ AREA} \\ \dfrac{(X - X_{PICK\ AREA}) * M_{DISPLAY\ AREA}}{M_{PICK\ AREA}} & : X_{PICK\ AREA} \leq X < X_{PICK\ AREA} + M_{PICK\ AREA} \\ M_{DISPLAY\ AREA} & : X \geq X_{PICK\ AREA} + M_{PICK\ AREA} \end{cases}$$

for $X = 0$, $M_{IMAGE}$

DISPLAY SCALING MAP

1306 — | M'(0) | M'(1) | M'(2) | ... | M'(M$_{DISPLAY\ AREA}$ - 3) | M'(M$_{DISPLAY\ AREA}$ - 2) | M'(M$_{DISPLAY\ AREA}$ - 1) |

DISPLAY SCALING MAP FUNCTION

1308 —
$$M'(X) = X_{PICK\ AREA} + \dfrac{X * (M_{PICK\ AREA} - 1)}{M_{DISPLAY\ AREA} - 1}$$

for $X = 0$, $M_{DISPLAY\ AREA} - 1$

FIGURE 13

SCALING MAP EXAMPLES

IMAGE LINE PIXEL POSITIONS ($M_{IMAGE}$ = 1024)

1402 ~ | 0 | 1 | 2 | 3 | ... | 1020 | 1021 | 1022 | 1023 |

DISPLAY LINE PIXEL POSITIONS ($M_{DISPLAY}$ = 640)

1404 ~ | 0 | 1 | 2 | 3 | ... | 636 | 637 | 638 | 639 |

SCALING MAP ($X_{PICK\ AREA}$ = 256, $M_{PICK\ AREA}$ = 512, $M_{DISPLAY\ AREA}$ = 320)

1406 ~ | 0 | 1 | ... | 256 | 257 | 258 | 259 | ... | 765 | 766 | 767 | 768 | ... | 1022 | 1023 |
       | 0 | 0 | ... | 0   | 0   | 1   | 1   | ... | 318 | 318 | 319 | 320 | ... | 320  | 320  |

DISPLAY SCALING MAP ($X_{PICK\ AREA}$ = 256, $M_{PICK\ AREA}$ = 512, $M_{DISPLAY\ AREA}$ = 320)

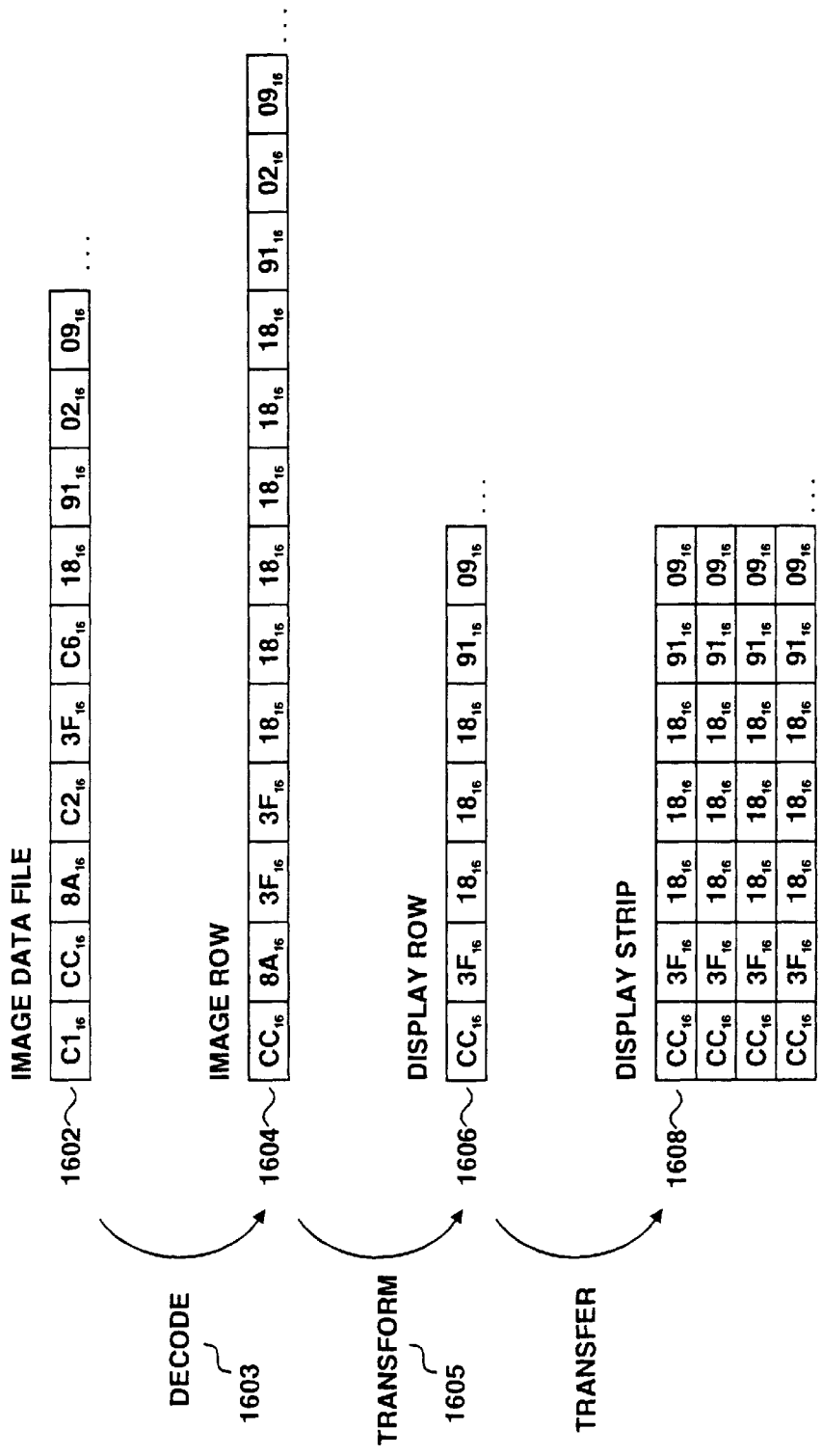

| $26_{16}$ | $1F_{16}$ | $7C_{16}$ | $7C_{16}$ | $26_{16}$ | $74_{16}$ | $7C_{16}$ |
|---|---|---|---|---|---|---|
| $A4_{16}$ | $9E_{16}$ | $A2_{16}$ | $90_{16}$ | $B9_{16}$ | $A1_{16}$ | $A2_{16}$ |
| $7E_{16}$ | $97_{16}$ | $26_{16}$ | $7D_{16}$ | $7C_{16}$ | $97_{16}$ | $7D_{16}$ |
| $95_{16}$ | $7D_{16}$ | $7D_{16}$ | $8C_{16}$ | $7E_{16}$ | $8B_{16}$ | $26_{16}$ |

1704:

| $7C_{16}$ | $74_{16}$ | $26_{16}$ | $7C_{16}$ | $7C_{16}$ | $1F_{16}$ | $26_{16}$ |
|---|---|---|---|---|---|---|
| $A2_{16}$ | $A1_{16}$ | $B9_{16}$ | $90_{16}$ | $A2_{16}$ | $9E_{16}$ | $A4_{16}$ |
| $7D_{16}$ | $97_{16}$ | $7C_{16}$ | $7D_{16}$ | $26_{16}$ | $97_{16}$ | $7E_{16}$ |
| $26_{16}$ | $8B_{16}$ | $7E_{16}$ | $8C_{16}$ | $7D_{16}$ | $7D_{16}$ | $95_{16}$ |

1706:

| $95_{16}$ | $7D_{16}$ | $26_{16}$ | $8C_{16}$ | $7E_{16}$ | $8B_{16}$ | $26_{16}$ |
|---|---|---|---|---|---|---|
| $7E_{16}$ | $97_{16}$ | $A2_{16}$ | $7D_{16}$ | $7C_{16}$ | $97_{16}$ | $7D_{16}$ |
| $A4_{16}$ | $9E_{16}$ | $7C_{16}$ | $90_{16}$ | $B9_{16}$ | $A1_{16}$ | $A2_{16}$ |
| $26_{16}$ | $1F_{16}$ | $7D_{16}$ | $7C_{16}$ | $26_{16}$ | $74_{16}$ | $7C_{16}$ |

1708:

| $26_{16}$ | $8B_{16}$ | $7E_{16}$ | $8C_{16}$ | $7D_{16}$ | $7D_{16}$ | $95_{16}$ |
|---|---|---|---|---|---|---|
| $7D_{16}$ | $97_{16}$ | $7C_{16}$ | $7D_{16}$ | $26_{16}$ | $97_{16}$ | $7E_{16}$ |
| $A2_{16}$ | $A1_{16}$ | $B9_{16}$ | $90_{16}$ | $A2_{16}$ | $9E_{16}$ | $A4_{16}$ |
| $7C_{16}$ | $74_{16}$ | $26_{16}$ | $7C_{16}$ | $7C_{16}$ | $1F_{16}$ | $26_{16}$ |

EXAMPLES OF ROTATING DISPLAY STRIPS

1802:

| $26_{16}$ | $1F_{16}$ | $7C_{16}$ | $7C_{16}$ | $26_{16}$ | $74_{16}$ | $7C_{16}$ |
| --- | --- | --- | --- | --- | --- | --- |
| $A4_{16}$ | $9E_{16}$ | $A2_{16}$ | $90_{16}$ | $B9_{16}$ | $A1_{16}$ | $A2_{16}$ |
| $7E_{16}$ | $97_{16}$ | $26_{16}$ | $7D_{16}$ | $7C_{16}$ | $97_{16}$ | $7D_{16}$ |
| $95_{16}$ | $7D_{16}$ | $7D_{16}$ | $8C_{16}$ | $7E_{16}$ | $8B_{16}$ | $26_{16}$ |

1804:

| $7C_{16}$ | $A2_{16}$ | $7D_{16}$ | $26_{16}$ |
| --- | --- | --- | --- |
| $74_{16}$ | $A1_{16}$ | $97_{16}$ | $8B_{16}$ |
| $26_{16}$ | $B9_{16}$ | $7C_{16}$ | $7E_{16}$ |
| $7C_{16}$ | $90_{16}$ | $7D_{16}$ | $8C_{16}$ |
| $7C_{16}$ | $A2_{16}$ | $26_{16}$ | $7D_{16}$ |
| $1F_{16}$ | $9E_{16}$ | $97_{16}$ | $7D_{16}$ |
| $26_{16}$ | $A4_{16}$ | $7E_{16}$ | $95_{16}$ |

1806:

| $26_{16}$ | $8B_{16}$ | $7E_{16}$ | $8C_{16}$ | $7D_{16}$ | $7D_{16}$ | $95_{16}$ |
| --- | --- | --- | --- | --- | --- | --- |
| $7D_{16}$ | $97_{16}$ | $7C_{16}$ | $7D_{16}$ | $26_{16}$ | $97_{16}$ | $7E_{16}$ |
| $A2_{16}$ | $A1_{16}$ | $B9_{16}$ | $90_{16}$ | $A2_{16}$ | $9E_{16}$ | $A4_{16}$ |
| $7C_{16}$ | $74_{16}$ | $26_{16}$ | $7C_{16}$ | $7C_{16}$ | $1F_{16}$ | $26_{16}$ |

1808:

| $95_{16}$ | $7E_{16}$ | $A4_{16}$ | $26_{16}$ |
| --- | --- | --- | --- |
| $7D_{16}$ | $97_{16}$ | $9E_{16}$ | $1F_{16}$ |
| $7D_{16}$ | $26_{16}$ | $A2_{16}$ | $7C_{16}$ |
| $8C_{16}$ | $7D_{16}$ | $90_{16}$ | $7C_{16}$ |
| $7E_{16}$ | $7C_{16}$ | $B9_{16}$ | $26_{16}$ |
| $8B_{16}$ | $97_{16}$ | $A1_{16}$ | $74_{16}$ |
| $26_{16}$ | $7D_{16}$ | $A2_{16}$ | $7C_{16}$ |

FIGURE 18

IMAGE TRANSFORMATION PROCESS

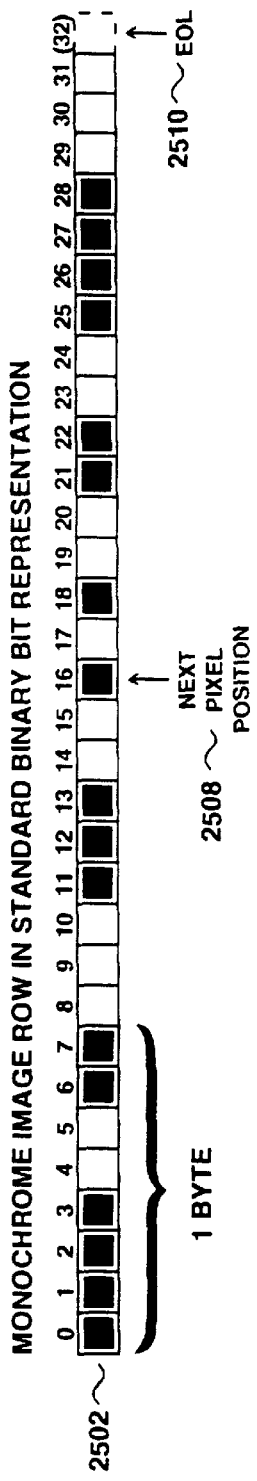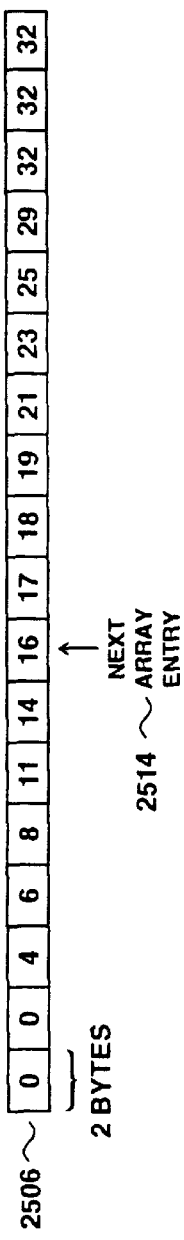
FIGURE 25

2702 — PREVIOUS BIT

2704 — CURRENT IMAGE BYTE

ZERO-BIT JUMP TABLE

2706 —

| IMAGE BYTE | ENCODING SEGMENT |
|---|---|
| 0 | NT8 |
| 1 | NT71 |
| 2 | NT611 |
| 3 | NT62 |
| . | . |
| 124 | NT152 |
| 125 | NT1511 |
| 126 | NT161 |
| 127 | NT17 |
| 128 | TR17 |
| 129 | TR161 |
| 130 | TR1511 |
| 131 | TR152 |
| . | . |
| 252 | TR62 |
| 253 | TR611 |
| 254 | TR71 |
| 255 | TR8 |

ONE-BIT JUMP TABLE

2708 —

| IMAGE BYTE | ENCODING SEGMENT |
|---|---|
| 0 | TR8 |
| 1 | TR71 |
| 2 | TR611 |
| 3 | TR62 |
| . | . |
| 124 | TR152 |
| 125 | TR1511 |
| 126 | TR161 |
| 127 | TR17 |
| 128 | NT17 |
| 129 | NT161 |
| 130 | NT1511 |
| 131 | NT152 |
| . | . |
| 252 | NT62 |
| 253 | NT611 |
| 254 | NT71 |
| 255 | NT8 |

FIGURE 27

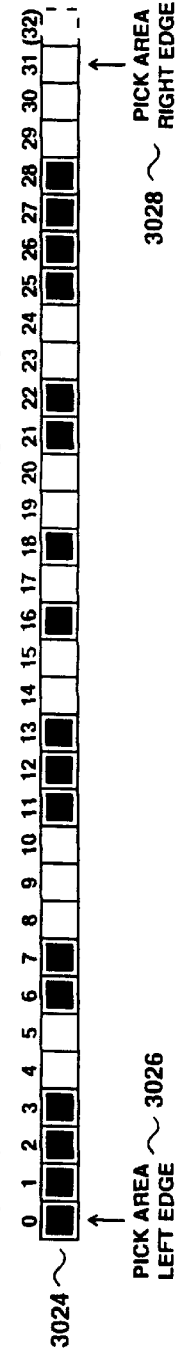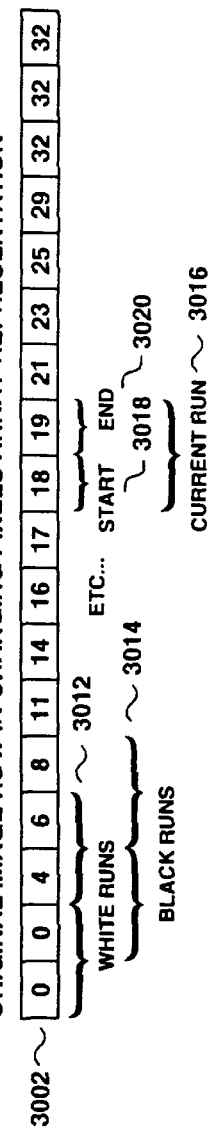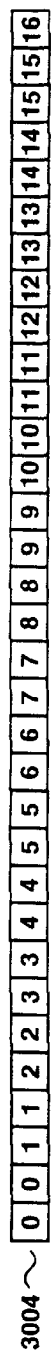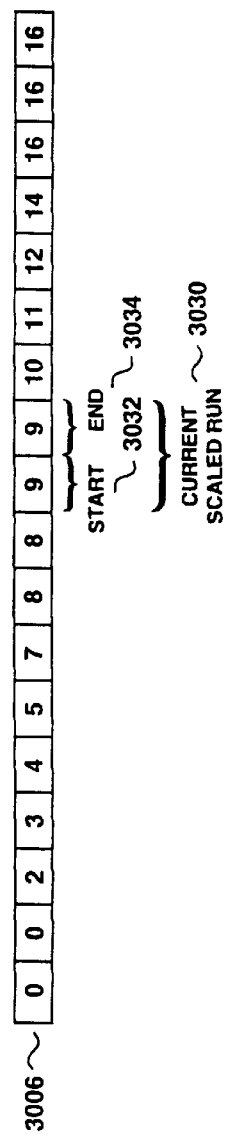
FIGURE 30

CHANGING PIXELS SCALING EXAMPLES (CONT.)

SCALED IMAGE ROW IN STANDARD BINARY BIT REPRESENTATION (BLACK RUNS)

SCALED IMAGE ROW IN STANDARD BINARY BIT REPRESENTATION (WHITE RUNS)

(3104 INVERTED FOR ILLUSTRATION PURPOSES)

FIGURE 31

SYSTEM AND METHOD TO DISPLAY RASTER IMAGES WITH NEGLIGIBLE DELAY TIME AND REDUCED MEMORY REQUIREMENTS

This application is a continuation of application Ser. No. 08/299,866 filed on Sep. 1, 1994, now abandoned.

BACKGROUND OF THE INVENTION

1. Field of the Invention

The present invention relates generally to raster image-based display technology. More specifically, the present invention relates to a system and method that enhances display rates of raster devices and reduces the quantity of memory needed to display a raster image.

2. Related Art

There are no adequate raster image viewing applications available today to provide, in a single complete package, the necessary capabilities to filly implement an image-based document viewing system. Most applications are too slow to meet display requirements (independent of the hardware platform) and are too cumbersome to use. Additionally, most applications do not support the various raster image formats required, especially CCITT-4 format and numerous and varying strains of TIFF format.

Raster devices failing to meet the display time requirements exhibit three main problems: (1) they require large amounts of RAM to display large raster images; (2) several seconds elapse from the time the raster image is selected for display, to the time the first rows of the raster image are displayed; and (3) the rates at which the raster images are decoded and displayed are too slow. As the size of the raster image increases, the amount of memory required to load and display the image increases. On virtual memory operating systems, large images induce page swapping, which significantly increases the time required to display the image. Some devices perform raster image transformations, such as rotations and mirroring, only on the raster images stored in RAM which sometimes requires several minutes to complete.

Thus, what is required is a raster image device that can generate raster images at a greater speed than current devices, independent of the computer hardware platform. Additionally, what is needed is a raster image device that requires significantly less memory than current raster devices.

SUMMARY OF THE INVENTION

The present invention is directed to a general purpose raster image system and method designed to provide quick and easy access to a wide variety of raster images, from a wide variety of fixed and user-definable views. The present invention performs transformations on an original raster image, and optimizes the raster image decoding and display techniques, to dramatically increase the display performance capabilities by a factor of up to fifteen times the performance provided by previous raster devices. The present invention employs two primary enhanced display features to produce fast raster image decode and display results: (1) data reduction and transformations and (2) optimized algorithmic implementations.

A. Data Reduction

In a preferred embodiment, data reduction and transformations operate as follows: a raster image is divided into strips, which are processed individually. By breaking the raster image up into fixed sized strips and processing each divided strip individually, instead of processing the entire raster image at once, the display process speed is enhanced. Each strip is displayed as it is completed, providing immediate feedback to the user.

Another feature of data reduction and transformations is to immediately scale each raster image line to display image line size. So as each raster image scan line is decoded from an image file, it is immediately scaled to the size of the display scan line. The processing time required for image operations performed later in the display process, such as rotations, mirroring, are not affected by the original raster image scan line size, only the size of the display line size, which usually remains constant.

Still another feature of data reduction and transformation is to perform color transformations once before the raster image strips are processed, and applied to the reduced display image strips just prior to the actual transference of the display image strips to the display device. This significantly reduces the number of color transformation calculations performed during the processing of each strip, and in some cases, replaces time consuming calculations with simple table look-up operations.

A further feature of data reduction and transformation is to detect raster image scan lines which do not affect the final display image, and terminate processing of those scan lines as soon as they are decoded from the raster image file during the display process. This further reduces process time.

Still a further feature of data reduction and transformation is to process an entire display image strip in less than 64K of memory, which significantly reduces the probability virtual memory paging will occur for large raster images and, on some computer systems, reduces the number of machine code instructions necessary to access display image data.

B. Optimized Algorithmic Implementation

A feature of the optimized algorithmic implementation is to increase processing thruput of the display process by optimizing the use of available resources required to decode and display the raster images. For example, significant processing speed is obtained by implementing selected critical portions of the raster image display instructions in assembly language to maximize the use of computer system processor CPU registers. Similar optimization techniques can be implemented for raster image decoding and display image transformations, for rotations and mirror operations. This feature of the optimized algorithmic implementation increases the performance of the display process a minimum of a factor of three.

Still an another feature of the optimized algorithmic implementation is to restructure decoding and display algorithms into tables of data and code segments, which is based on a current flow of raster image data being processed. For example in one embodiment, scaling operations are converted from calculation based algorithms, to data lookup tables indexed by the position of the raster image data in the original scan line. Raster image decoding algorithms are changed from iterative conditional loops to redundant code segments individually tailored for specific occurrences of raster image data. These techniques increase the actual quantity of instructions used to code the algorithms, however, because the new structure of the process is based on the flow of the raster image data stream coming into the process, execution performance is increased by a minimum factor of three. Thus, processing thruput of the display process is increased by optimizing the use of available resources required to decode and display raster images.

Decode and display processes are data driven instead of classical iterative techniques. Implementation of assembly language in time critical sections of display procedures allocates CPU register resources more efficiently and significantly increases performance. Data driven techniques, such as data translation tables and automatic redundant data-specific code sections, reduces the quantity of calculations required to accomplish high repetitive tasks thereby significantly increasing performance.

Accordingly, the present invention improves the performance of raster image viewing applications in a cost effective manner. For example, there is no need to modify hardware to obtain increased thruput. Additionally, significantly less computer associated memory is needed to employ the present invention, than previous raster image viewing devices.

Further features and advantages of the present invention, as well as the structure and operation of various embodiments of the present invention, are described in detail below with reference to the accompanying drawings.

BRIEF DESCRIPTION OF THE FIGURES

FIG. 5 is a block diagram illustrating an example image data structure.

FIG. 10 is an image chart illustrating color bits per pixel according to a preferred embodiment of the present invention.

FIG. 11 is a block diagram illustrates color bits per pixel promotion (how rounding up an uncommon bit configuration reduces the effort required to access image information) according to a preferred embodiment of the present invention.

FIG. 12 is a block diagram illustrating work buffers and the number of data bytes allocated for each buffer according to a preferred embodiment of the present invention.

FIG. 13 is a block diagram illustrating scaling map generation according to a preferred embodiment of the present invention.

FIG. 14 is a block diagram illustrating scaling maps for a sample image row of 1024 pixels and display row of 640 pixels according to a preferred embodiment of the present invention.

FIG. 16 is a block diagram illustrating basic data conversion process (image-to-display image decoding) performed in a process according to a preferred embodiment of the present invention.

FIG. 17 is a block diagram illustrating the results of mirroring a display strip horizontally, vertically, and both horizontally and vertically according to a preferred embodiment of the present invention.

FIG. 18 is a block diagram illustrating the results of rotating a display strip 90 degrees, 180 degrees, and 270 degrees.

FIG. 25 is a block diagram illustrating the relationship between the 1 bit/pixel form and the changing pixels form according to a preferred embodiment of the present invention.

FIG. 27 illustrates jump tables according to a preferred embodiment of the present invention.

FIGS. 30 and 31 illustrate changing pixels scaling examples according to a preferred embodiment of the present invention.

DETAILED DESCRIPTION OF THE PREFERRED EMBODIMENTS

The present invention is directed to a system and method that enhances display rates of raster devices and is not limited to any particular operating system or computer system. The present invention can be implemented to function in a Microsoft Windows environment, Microsoft DOS environment, UNIX environment, Apple Macintosh environment, etc., and most computer systems capable of supporting raster graphics.

The operation of the invention will now be described. Before getting into a detailed description of each operational step shown in the figures, a few concepts are presented with reference to Figures they are described. First, a brief discussion on the various forms of representation of raster image used in the invention is presented. Second, a brief overview of the display technique is discussed. Third, an image data structure used to store information about the image, the display device, and the display process parameters, during the steps of the process, is discussed. Fourth, a detailed discussion of the display process steps is presented.

1.0 Raster Image Forms

Figure 1:
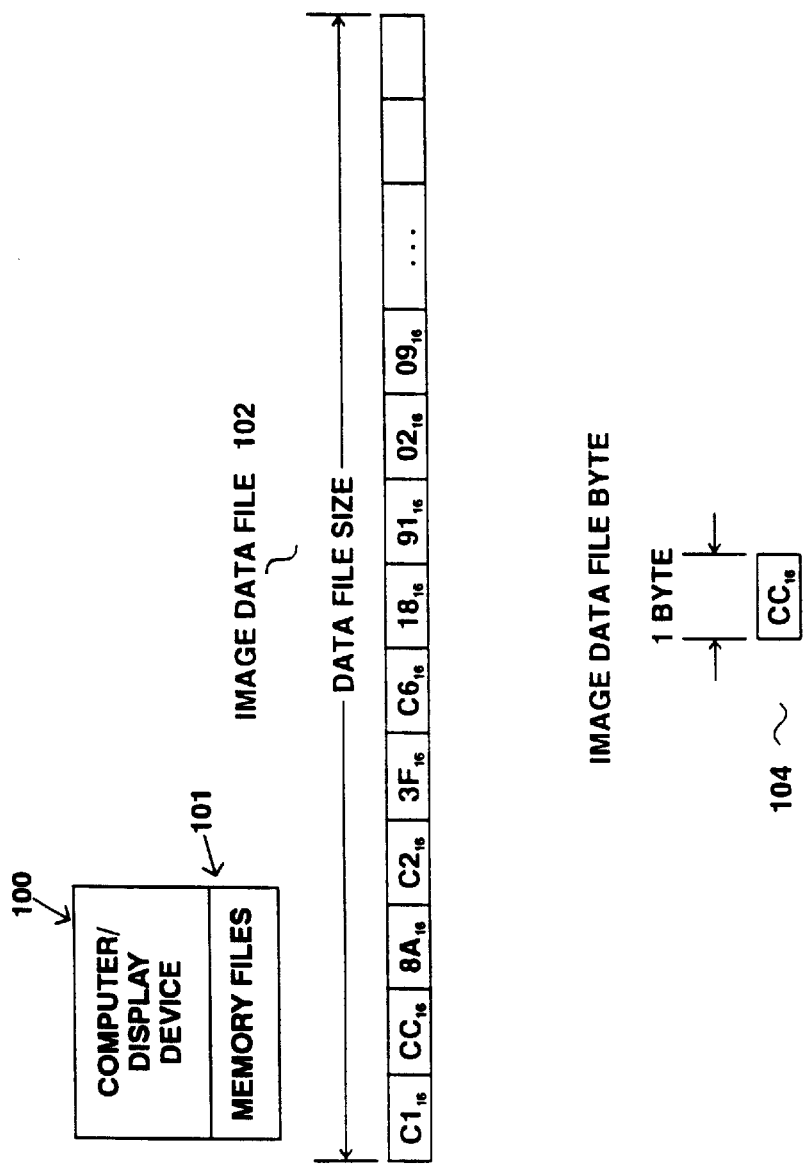
FIG. 1 is a block diagram illustrating a data file representation of a raster image.
Figure 2:
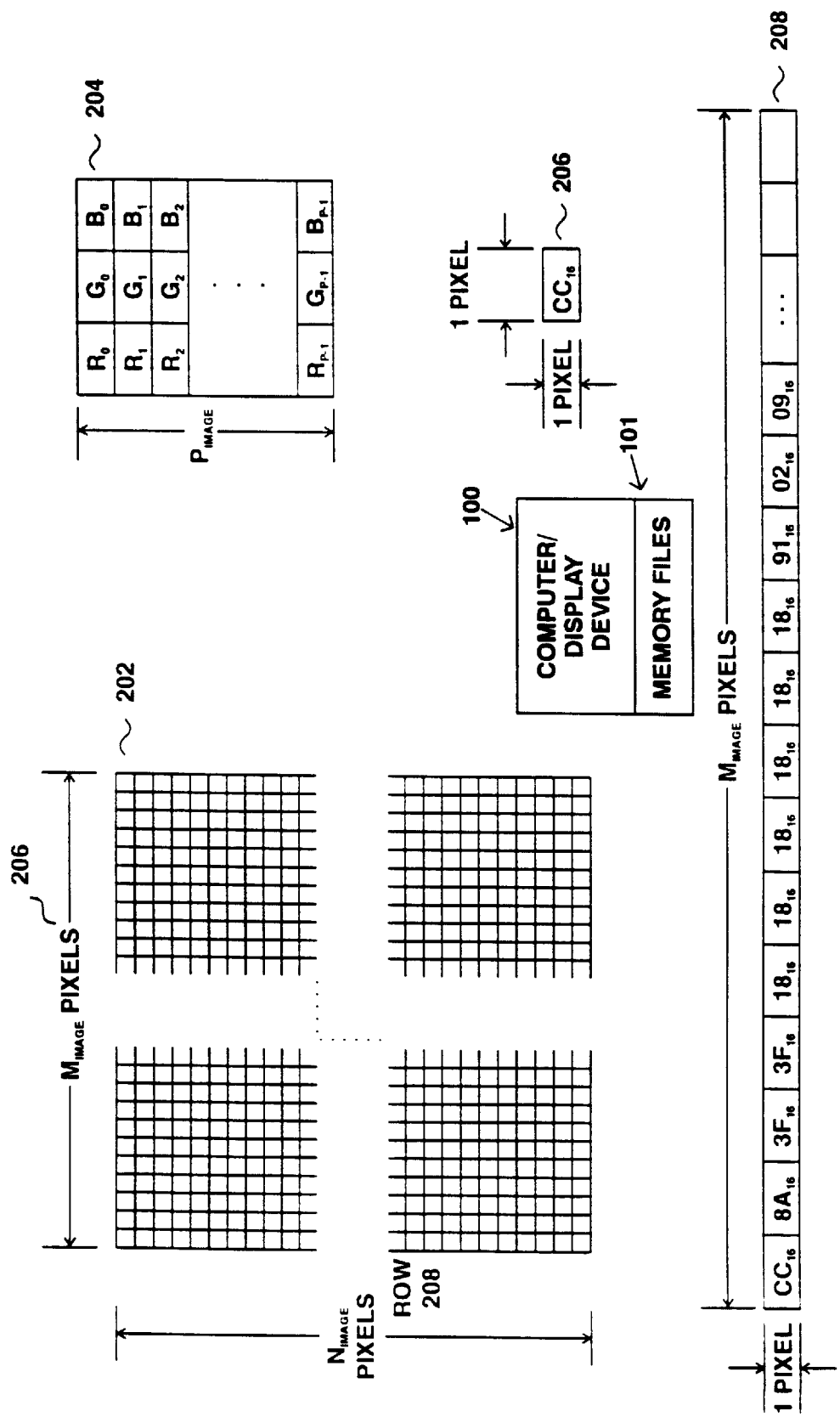
FIG. 2 is a block diagram illustrating an original image representation of a raster image.
Figure 3:
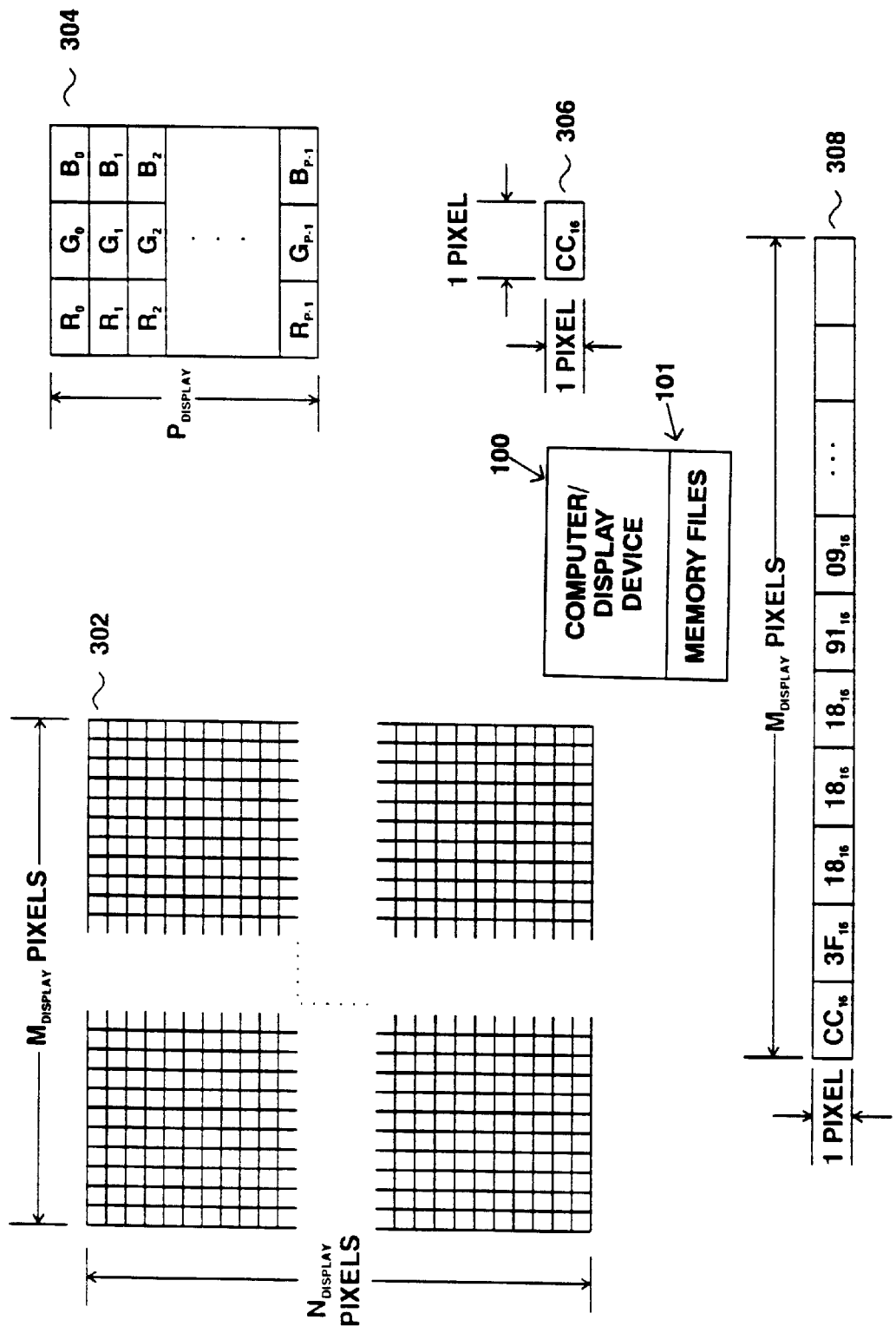
FIG. 3 is a block diagram illustrating a display image representation of a raster image.

FIGS. 1, 2, and 3 are block diagrams illustrating the same raster image in memory 101 of computer 100 in three distinct raster image forms employed in a preferred embodiment of the present invention including: (1) an image data file 102, (2) an original image 202, decoded to the size and color content specified in image data file 102, and (3) a display image 302, scaled and transformed from original image 202, for display on a computer system display device 100 as shown in FIGS. 1 to 3. Each distinct raster image form 102, 202, 302 will now be described in more detailed.

FIG. 1 is a block diagram illustrating the image data file 102 residing in the memory 101 of computer 100. Image data file 102 consists of one or more image data file bytes 104. Each image data file byte 104 is an 8-bit value of encoded image data. The size of a computer data file in computer 100 depends upon the size of the image and the encoding method used to encode the image data. The encoding method, which is also known as the image format, can be any one of many industry standard methods, selected by the creator of data file 102. Examples of industry standard image formats are Aldus/Microsoft Tagged Image File Format (TIFF), ZSoft PCX, Microsoft Windows BMP, CCITT Group IV. Image data file 102 is an example of the ZSoft's PCX Run Length Encoding (RLE) method.

FIG. 2 is a block diagram illustrating an original image 202. Image 202 consists of $N_{IMAGE}$ image pixel rows 208 and an optional image color palette 204. Each image pixel row 208 consists of $M_{IMAGE}$ image pixels 206. Each image pixel 206 is a pixel color value that specifies the color of image 202 at that pixel's location. In the preferred embodiment of the present invention, the color values for image pixel 206 may be anywhere from 1 bit to 24 bits, depending upon the image format of image 202.

Image color palette 204 is an optional lookup table indexed by the image pixel 206 color values. The image format determines whether image color palette 204 exists for image 202. The concepts of image color palettes are standard with the industry and is known by those skilled in the art.

FIG. 3 is a block diagram illustrating a display image 302. Display image 302 consists of $N_{DISPLAY}$ display image pixel rows 308 and an optional color palette 304. Each display image pixel row 308 consists of $M_{DISPLAY}$ display image pixels 306. Each display image pixel 306 is a pixel color value that specifies the color of display image 302 at that pixel's location. In the preferred embodiment of the present invention, the color values for image pixel 206 may be anywhere from 1 bit to 24 bits, depending upon the computer system display device. Display image color palette 304 is functionally equivalent to image color palette 204.

2. Overview of the Display Method

Figure 4:
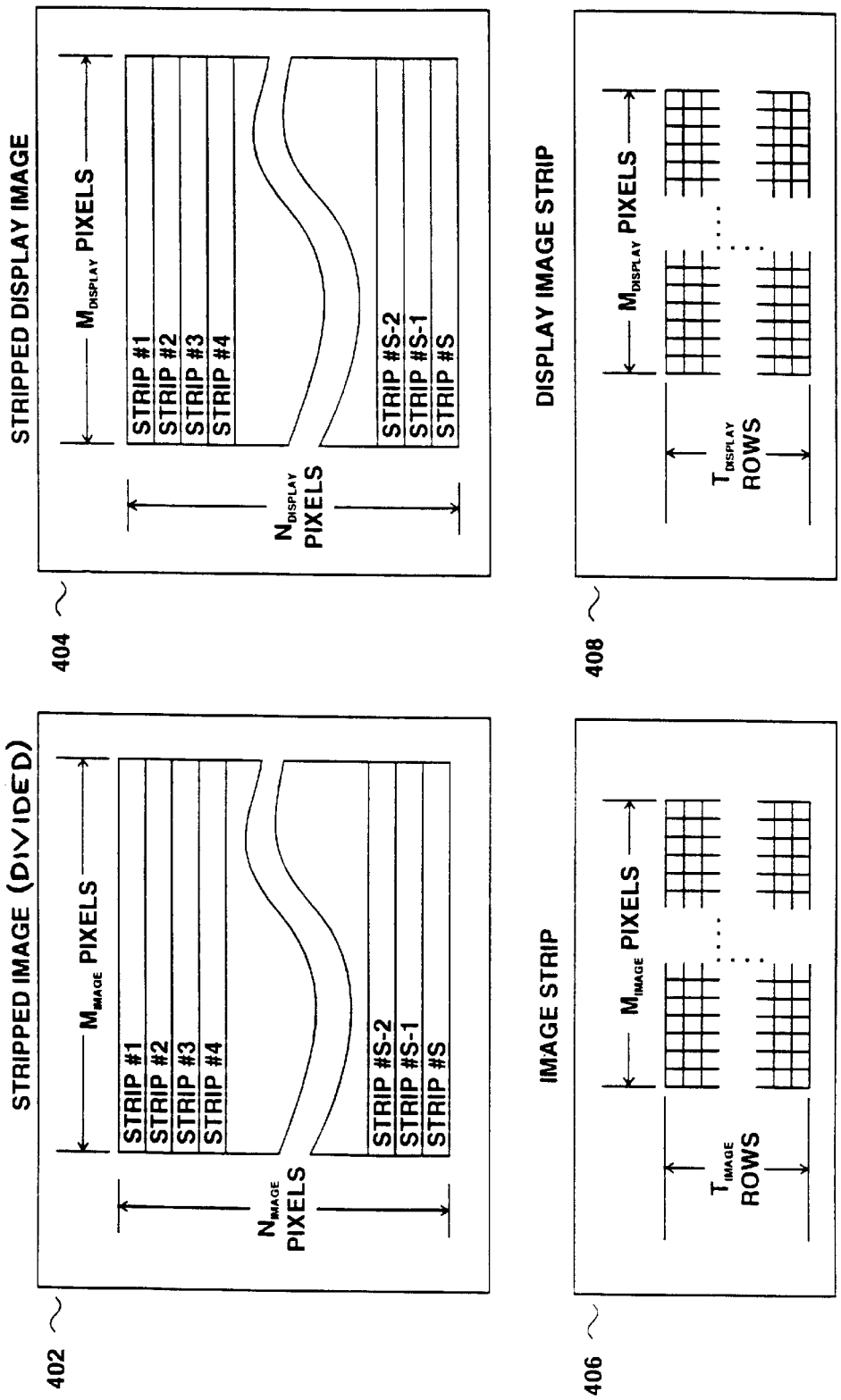
FIG. 4 is a block diagram illustrating an a stripped or divided image technique.

Referring to FIGS. 2, 3, and 4, the preferred embodiment of the present invention employs an image strip technique, shown in FIG. 4, that logically represents image 202 and display image 302 as stripped image 402 and stripped display image 404. Display image 404 is generated by transforming image strips 406 of image 402 into display image strips 408 of image 404. Image 402 consists of S equal size image strips 406. Each image strip 406 consists of $T_{IMAGE}$ image rows 208. Likewise, display image 404 consists of S equal size display image strips 408. Each display image strip consists of $T_{DISPLAY}$ display image rows 308. The size of image strip 406, $T_{IMAGE}$, is calculated by dividing the image height, $N_{IMAGE}$, by the total number of image strips, S. The total number of image strips, S, is calculated by dividing the display image height, $N_{DISPLAY}$, by display strip size, $T_{DISPLAY}$, a predefined constant.

3. Overview of the Image Data Structure

FIG. 5 is a block diagram illustrating an example image data structure 502. Referring to FIG. 5, image data structure 502, is used in the preferred embodiment of the present invention to maintain information about the raster image to be displayed. Image data structure 502 consists of input parameters 510, optional input parameters 520, image parameters 530, display parameters 540, process flow parameters 550, and work buffers 560. Image data structure 502 will now be described in more detail.

Input parameters 510 are the parameters which must be specified prior to beginning process 900 (to be described with reference to FIG. 9). Input parameters 510 consists of file name 511, inverse image colors flag 512, inverse display colors flag 513, rotation angle 514, mirror flag 515, dither allowed flag 516, display strip size 517.

File name 511 is the character file name passed to the operation system to open the image computer data file for reading image data bytes.

Inverse image colors flag 512 identifies whether the image pixel 206 color values are to be numerically inverted before image 202 is transformed by process 900 into image 302. Numerical inversion is an industry standard process where the color values are replaced with the color value obtained by subtracting the current color value from the maximum possible color value.

Inverse display colors flag 513 identifies whether the display image pixel 306 color values are to be numerically inverted before display image 302 is displayed on the display device.

Rotation angle 514 is the numeric angle or rotation to be applied to display image 302 before it is displayed on the display device. Rotation angle 514 may be set to 0 degrees, 90 degrees, 180 degrees, or 270 degrees.

Mirror flag 515 identifies the horizontal and/or vertically mirroring transformation to be displayed to display image 302 before it is displayed on the display device. Mirror flag may be set to 0 for no mirroring, 1 for vertical mirroring, 2 for horizontal mirroring, or 3 for both vertical and horizontal mirroring.

Dither allowed flag 516 identifies if color dithering techniques may be applied to display image pixel 306 color values, if it is determined necessary for the display device. Color dithering is an industry standard method of simulating the appearance of multiple or different colors on a display device with a limited or restricted number of possible pixel color values. Examples of color dithering methods are the Bayer dithering method and the Floyd-Steinberg dithering method.

Display strip size 517 is the number of display image rows 308, shown in FIG. 3, per display image strip 408, shown in FIG. 4.

Optional input parameters 520 are the parameters which may or may not be specified prior to beginning process 900. If the parameters are not specified then the parameters are initialized to default values, as appropriate. Optional input parameters 520 consists of pick area coordinates 521 and display area coordinates 522.

Figure 6:
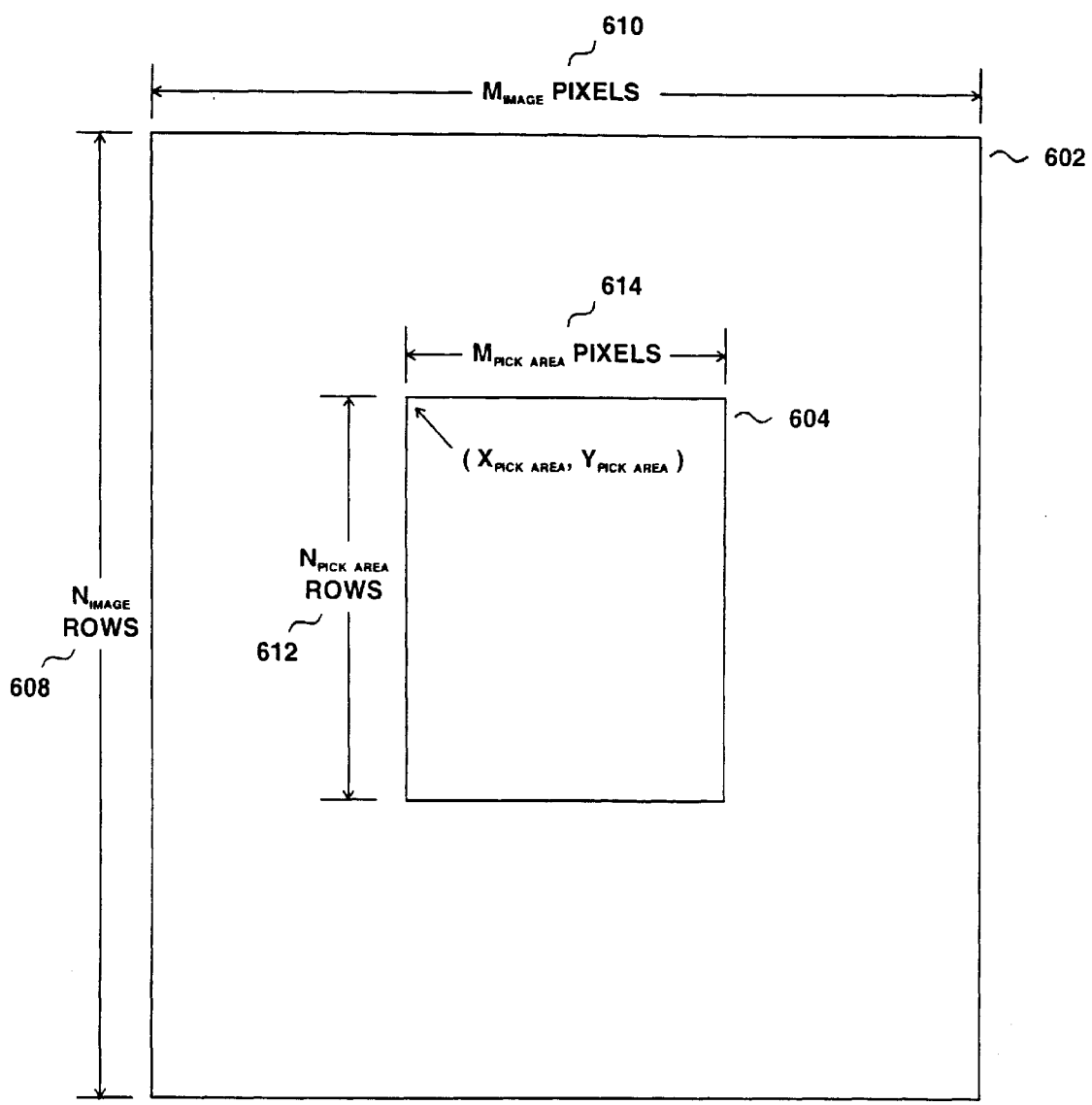
FIG. 6 is a block diagram illustrating sample image as image with pick area superimposed on top.

Pick area coordinates 521 are the coordinates and dimensions of the portion of image 202 that must be displayed on the display device. FIG. 6 is a block diagram illustrating sample image 202 as image 602 with pick area 604 superimposed on top. Image 602 is a raster image with $N_{IMAGE}$ rows 608 of $M_{IMAGE}$ pixels 610. Pick area 604, located at the coordinates ($X_{PICK\ AREA}$, $Y_{PICK\ AREA}$), with $N_{PICK\ AREA}$ rows 612 of $M_{PICK\ AREA}$ pixels 614, is the portion of image 602 to be displayed on the display device. If pick area coordinates 521 are not defined then they are initialized to the coordinates and dimensions of image 602.

Figure 7:
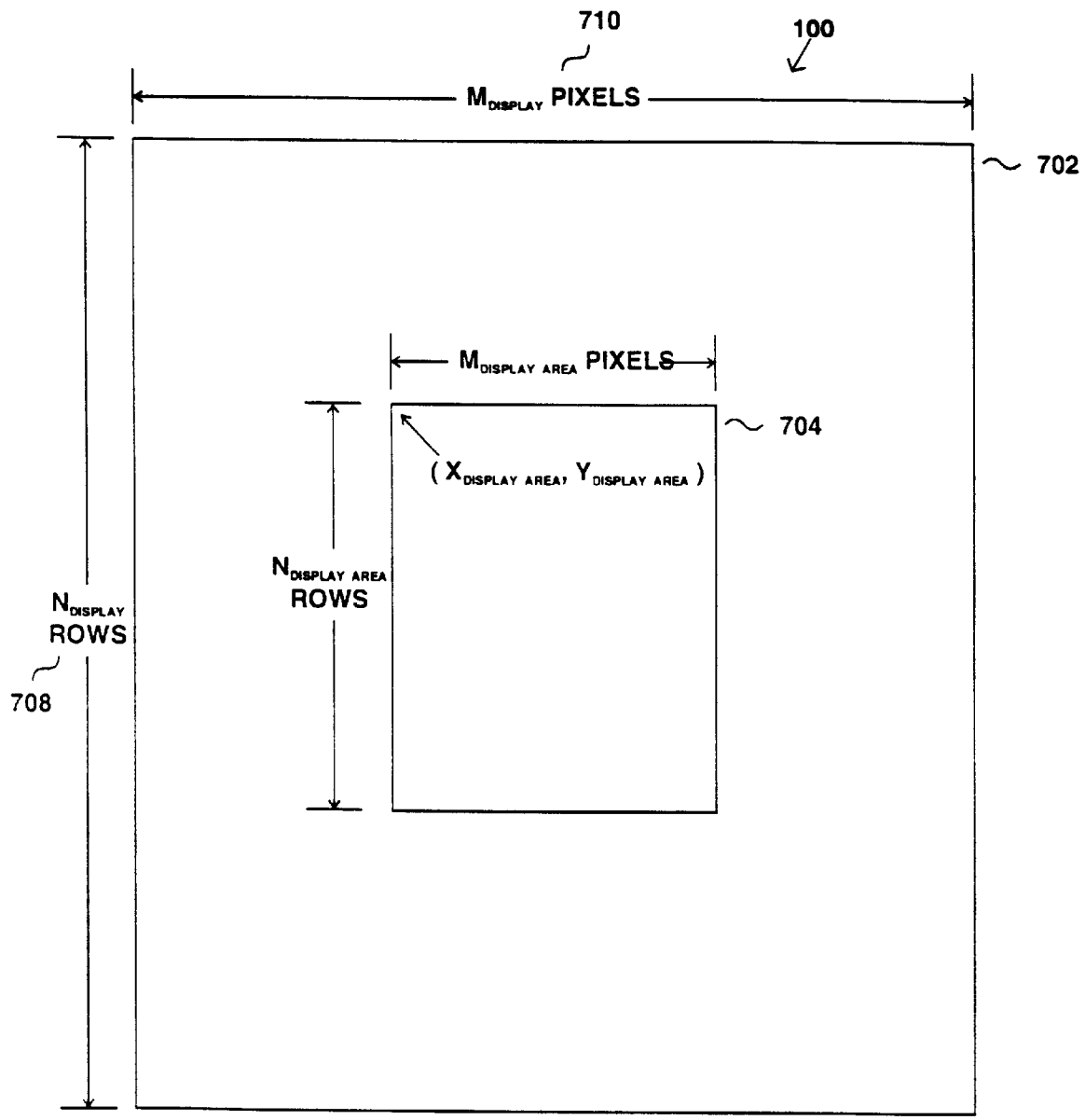
FIG. 7 is a block diagram illustrating a computer system display device as display image and a display area superimposed on top.

Display area coordinates 522 are the coordinates and dimensions of the portion of the computer system display device that can be used to display image pick area 604. FIG. 7 is a block diagram illustrating a computer system display device 100 showing a display image 702 and a display area 704 superimposed on top. Display image 702 is a raster image with $N_{DISPLAY}$ rows 708 of $M_{DISPLAY}$ pixels 710. Display area 704, located at the coordinates ($X_{DISPLAY\ AREA}$, $Y_{DISPLAY\ AREA}$), with $N_{DISPLAY\ AREA}$ rows of $M_{DISPLAY\ AREA}$ pixels, is the portion of display image 702 to be displayed on the display device. If display area coordinates 522 are not defined then they are initialized to the coordinates and dimensions of image 702.

Image parameters 530 are parameters that describe the raster image. They are read from image computer data file 102, as defined by the image computer data file encoding method. Image parameters 530 consists of format 531, width 532, height 533, bits per pixel 534, bit planes 535, palette size 536, and palette buffer 537.

Figure 8:
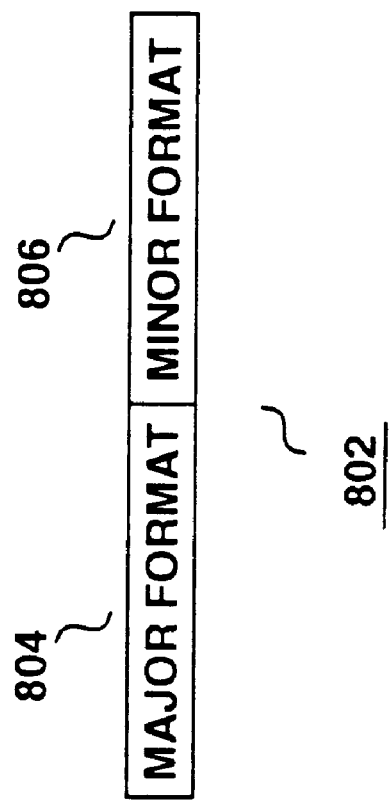
FIG. 8 is a block diagram illustrating two image format types.

Format 531 is a two byte number 802 as in illustrated in FIG. 8, which illustrates an image format type 800. The first byte 804 is called the major format. Examples of major format are TIFF and PCX etc. The second byte 806 is called the minor format. Examples of minor format are monochrome, 16-color, 256-color, 16-color LZW compressed, etc. The range of possible values for the minor format 806 varies based on the major format 804.

Width 532 is the number of image pixels 206 in image row 208. Height 533 is the number of image rows 208 in image 202.

Bits per pixel 534 and bit planes 535 specify the number of data color bits required to specify the color for each pixel. The number of data color bits is equal to the product of bits per pixel 534 and bit planes 535. The preferred embodiment of the present invention supports raster images requiring 1, 4, 8, and 24 data color bits per pixel. The concept of bit per pixel and bit planes for raster images is well known by those skilled in the art and will not be discussed in any further detail.

Palette size 536 and palette buffer 537 specify a color lookup table which may be required to determine the actual color to be display for a given pixel color value. A color palette may or may not be defined for a raster image, depending upon the image format and computer data file encoding method. The preferred embodiment of the present invention supports color palettes from 2 to 256 colors. The concept of color palettes for raster images is well known by those skilled in the art and will not be discussed in any further detail.

Display parameters 540 are parameters that describe the color capabilities of the display device. Display parameters 540 consists of display bits per pixel 541, display bit planes 542, display palette size 543, and display palette buffer 544. These parameters are identical in function and meaning to their corresponding image parameters and will not be discussed in any further detail.

Process flow parameters 550 are additional parameters initialized and used during the image transformation process to control the flow of the process. Process flow parameters 550 consists of dither required flag 551, image strip size 552, row number 553, display row number 554, and data file offset 555, number of strips 556, image color bits 557, display color bits 558.

Dither required flag 551 is a boolean flag set to indicate that the image transformation process will have to dither image 202, after it is scaled down to the size of display image 302. Image strip size 552 is the number of image rows 208 required for an image strip 406 to generate a display strip 408. Row number 553 is the number of the next image row 208 to be decoded from image data file 102. Display row number 554 is the number of the next display row 308 to be displayed on the computer system display device. Data file offset 555 is the offset from the start of the image data file 102 of the next image data file byte 104 to be read. Number of strips 556 is the number of strips on images 402 and 404 of FIG. 4. Image color bits 557 and display color bits 558 are the number of color bits per pixel for the image and display device respectfully.

Work buffers 560 are data buffers allocated during the image transformation process for storing the image data as it is being processed. Work buffers 560 consist of data file buffer 561, display strip buffer 562, image row buffer 563, temp storage buffer 564, display row buffer 565, color map buffer 566, scaling maps buffer 567, dither buffers 568, and rotate buffers 569. Data file buffer 561 is a data buffer used to store data read from the image computer data file 102. Display strip buffer 562 is a data buffer used to store the display image rows 308 as they are generated during the image transformation process. Image row buffer 563 is a data buffer used to store the image rows 208 as they are decoded from the image computer data file 402. Temp storage buffer 564 is a data buffer used to image rows 208 and display rows 308 as the image transformation process is performed. Display row buffer 565 is a data buffer used to store display rows 308 as they are generated during the image transformation process. Color map buffer is a data buffer used to store a color map translation table to translate image color palette 204 to display color palette 304. Scaling map buffer 567 is a data buffer used to store scaling map translation tables to translate pixel positions in image rows 208 to pixel positions in display rows 308.

4. Process Steps Detailed Description

The image display process will now be described. FIG. 9 is a flow chart illustrating a raster image display process 900 according to a preferred embodiment of the present invention. Process 900 includes operational steps 902–922. Steps 902–908 represent initialization of an image data structure 502, shown in FIG. 5, and allocation of any resources to be employed by process 900. Steps 910–918 represent a main loop of process 900 in which original image 102 is decoded and transformed into display image 104 on a display strip by display strip basis. Steps 920–922 represents deallocation of resources employed by process 900. Steps 902–922 will now be described in more detail.

Figure 9:
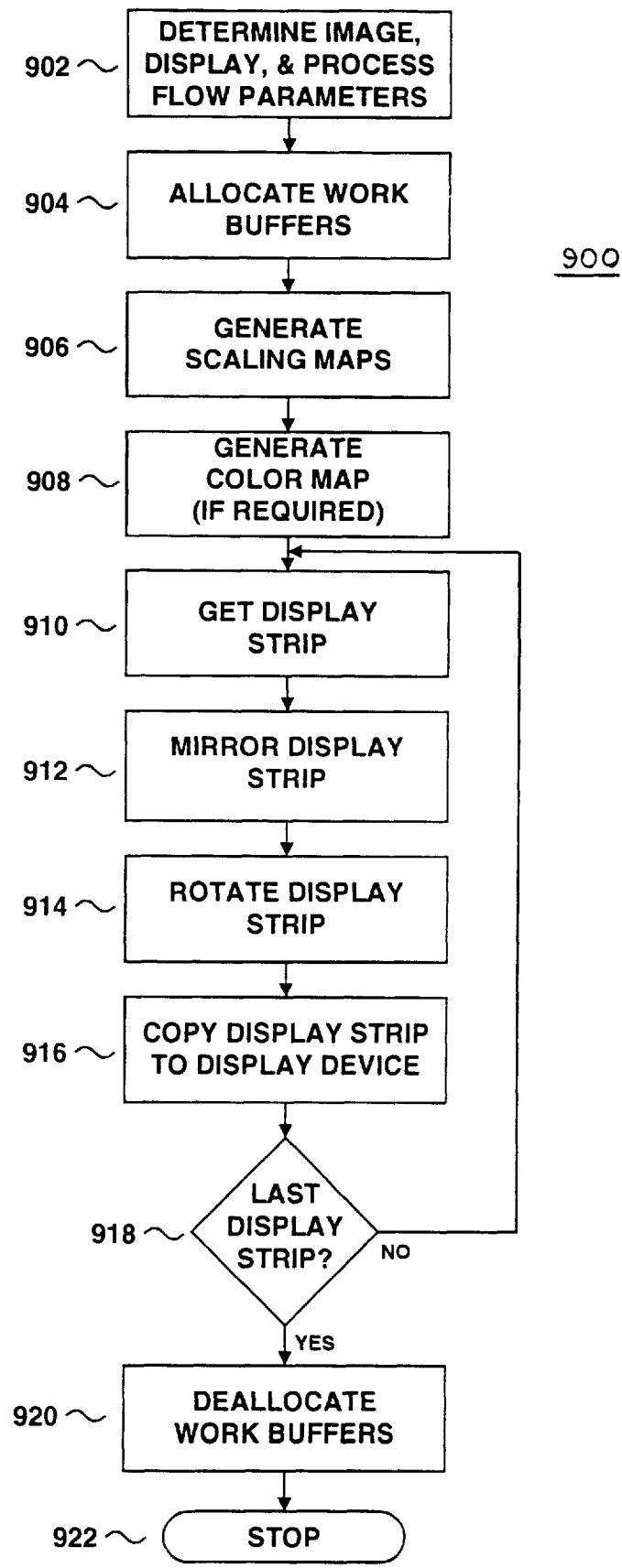
FIG. 9 is a flow chart illustrating a raster image display process according to a preferred embodiment of the present invention.

Referring to FIGS. 1, 5, and 9, process 900 beings in step 902 by determining the image, display, process flow, and optional input parameters. The image file name 511 is used to access the image data file 102 resident on a computer system and open it for reading.

Once opened, selected portions of image data file 102 is read into data file buffer 561, and its contents are checked for standard image format signature information to identify the image major format 804, shown in FIG. 8, (e.g. PCX, TIFF, etc.). The remaining image parameters, 532–537, are read from data file 102 and used to determine the image minor format 806 (e.g. monochrome, 16-color, etc.). Optionally, if optional input parameter pick area coordinates 521 is not defined, then it is initialized to the full image coordinates.

Additionally, in step 902 the display parameters display bits per pixel 541 and display bit planes 542 are retrieved from the computer system graphical interface. Optionally, if optional input parameter display area coordinates 522 is not defined, then it is initialized to the full display area coordinates for the computer system display device.

Finally, in step 902 process flow parameters 550 are determined based on the input parameters 510, optional input parameters 520, image parameters 530, and display parameters 540 already defined. Dither required flag 551 is set to true if image color palette 212 contains more entries than are available in display image color palette 312, otherwise it is set to false.

The number of image strips 556 is calculated by dividing the number of display image rows, from display area coordinates 522, by the display strip size 517. Image strip size 552 is calculated by dividing the number of image rows 533 by the number of image strips 556. Row number 553, display row number 554, and data file offset 555, are automatically initialized to zero.

Image color bits 557 and display color bits 558 are calculated from the image parameters 530 and display parameters 540, respectfully, as shown in FIG. 10. Bits per pixel is multiplied by bit planes, to obtain the actual color bits per pixel. Table 1008 is then used to round the actual color bits per pixel up to the near common color bits per pixel value of 1, 8, or 24 bits per pixel.

The same technique is interchangeably used for both image color bits 557 and display color bits 558, unless the number of image color bits 557 is equal to 1. In the preferred embodiment of the present invention, all of the display devices are assumed to be directly capable of supporting image information with 1 color bit per pixel, regardless of the computed value for display color bits 558. If the number of image color bits 557 is determined to be equal to 1 then the number of display color bits 558 is automatically set to 1 and the image information passed to the display device for display will be in a 1 bit/pixel form. If this assumption is not valid for future embodiments of the present invention then an additional transformation step will have to be added to the 1 bit/pixel processes discussed below.

The rounding up of color bits to 1, 8, or 24 color bits is performed to provide the most suitable processing environment for the image data. Computer systems are designed to process data in groups of 8 bits, such as 8 bit bytes, 16 bit words, and 32 bit words. If the original image data were left in any of the uncommon bit configurations possible (e.g. 2, 3, 4, 5, etc.), then extra processing instructions would be necessary in each basic component of the present invention to process this type of image information.

FIG. 11 is a block diagram illustrating how rounding up an uncommon bit configuration reduces the effort required to access image information. Row 1102 is a sample row of image data represented as individual pixels. Each pixel is assumed to have a color value of 0 to 15. Row 1104 is the data from sample row 1102 stored as a 4 color bits per pixel. Each data byte in row 1104 represent 2 pixels of row 1102. Row 1106 is the data from sample row 1102 rounded up to 8 color bits per pixel. Each data byte in row 1106 represents 1 pixel of row 1102. In order to access a single pixel from row 1104, the computer has to determine the byte offset of the desired pixel, retrieve the pixel's byte from the image row of data, mask off the other pixel stored in the same byte as the desired pixel, and possibly shift the desired pixel information to the low bits of the byte. However to access a single pixel from row 1106, the computer has only to determine the byte offset of the desired pixel and retrieve the pixel's byte from the image row of data. A computer can access a single pixel faster from row 1106 than it can from row 1104 because each pixel in row 1106 falls on a byte boundary and each byte of row 1106 contains only one pixel.

Although rounding up the image color bits 557 and display color bits 558 up 8 or 24 color bits value may increase the amount of memory required for data buffers 560 used in process 900, the processing speed gained provide a much greater advantage in the actual display speed obtained.

Referring back to FIG. 9, next, in step 904 work buffers 560, and any other required system dependent resources, are allocated according to the image, display and flow parameters from step 902. FIG. 12 is a block diagram illustrating work buffers 560 and the number of data bytes allocated for each buffer. For example, the size of image row buffer 1206, used to store image pixel rows 208 is calculated from pixels per row 532 and the image color bits per pixel 557. So an image consisting of 4 bit planes, 1 bit per pixel, which is equal to 8 color bits per pixel after promotion, and 512 pixels per row would require a work buffer 1206 to be 512 bytes.

Next, in step 906 of FIG. 9 scaling maps 1302 and 1306, shown in FIG. 13, are initialized based on the pick area coordinates 521, display area coordinates, 522, and the image width 532. Image scaling map 1302 is used to scaling image row pixel positions to display row pixel positions. Display scaling map 1306 is used to determine which image row pixels map to which display row pixels. Image scaling map function 1304 is used to calculate the values for scaling map 1302 and display scaling map 1308 is used to calculate the values for scaling map 1306.

Figure 9A:
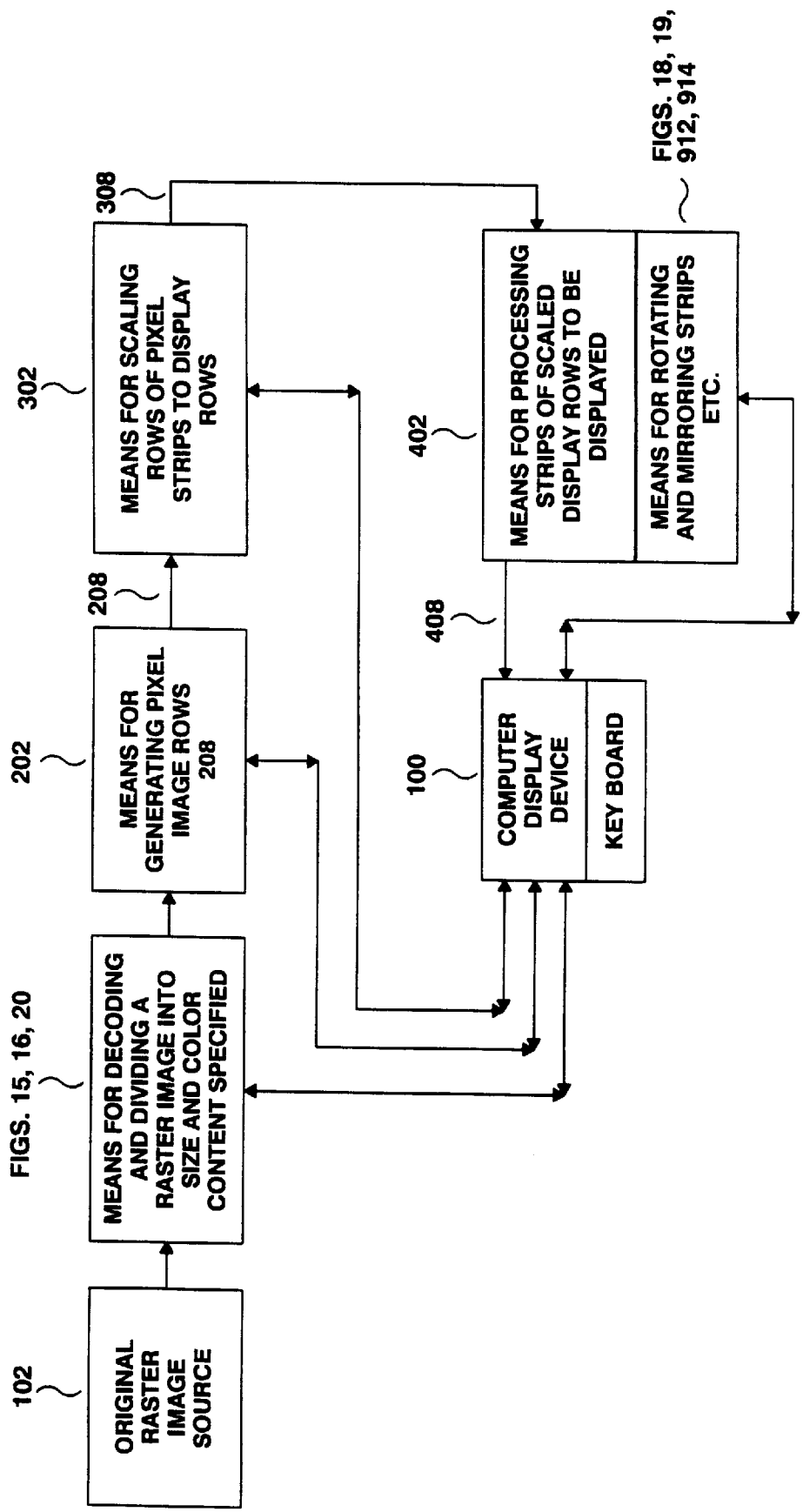
FIG. 9A is a basic system block diagram illustrating the preferred embodiment steps shown and described with reference to FIGS. 1 to 4.

Refer now to FIG. 9A showing the basic system for displaying an image data file 102 which is encoded in an industry standard format such a TIFF, CCITT Group IV, Lempel Ziv Welch or Z Soft PCX format as explained hereinbefore with reference to FIG. 1. The raster image data file 102 may be from any source such as a ROM data base, a hard magnetic disk or an incoming data stream and contains its own identifying information and is transformed at the second block under computer 100 control to an original pixel image 202 by decoding to size and color content as specified in image file 102. The image pixels 208 shown in FIG. 2 are converted to a display raster image 302 by scaling and transforming the original pixel image 202 comprising pixels 206 each having a color value specified in the original image format 202. The display image 302 is presented as display image pixel rows 308 to block 402 as a stripped image. The display image consists of equal sized image strips 408 which are further processed before being displayed in accordance with the image data structure shown and described with FIG. 5 etc.

The image parameters of FIG. 5 are read from data file 102 and processed by the computer in block 402 according to the process shown in FIG. 9 etc. The processed strips at line 408 are now displayed as the strips are processed until all strips are displayed. The sequence is repeated as the next image data file 102 in the stream is converted to pixel rows 208, then converted to display strips 308, then to converted to display image strips 408 as shown in flow diagram FIGS. 20 to 22.

Figure 9B:
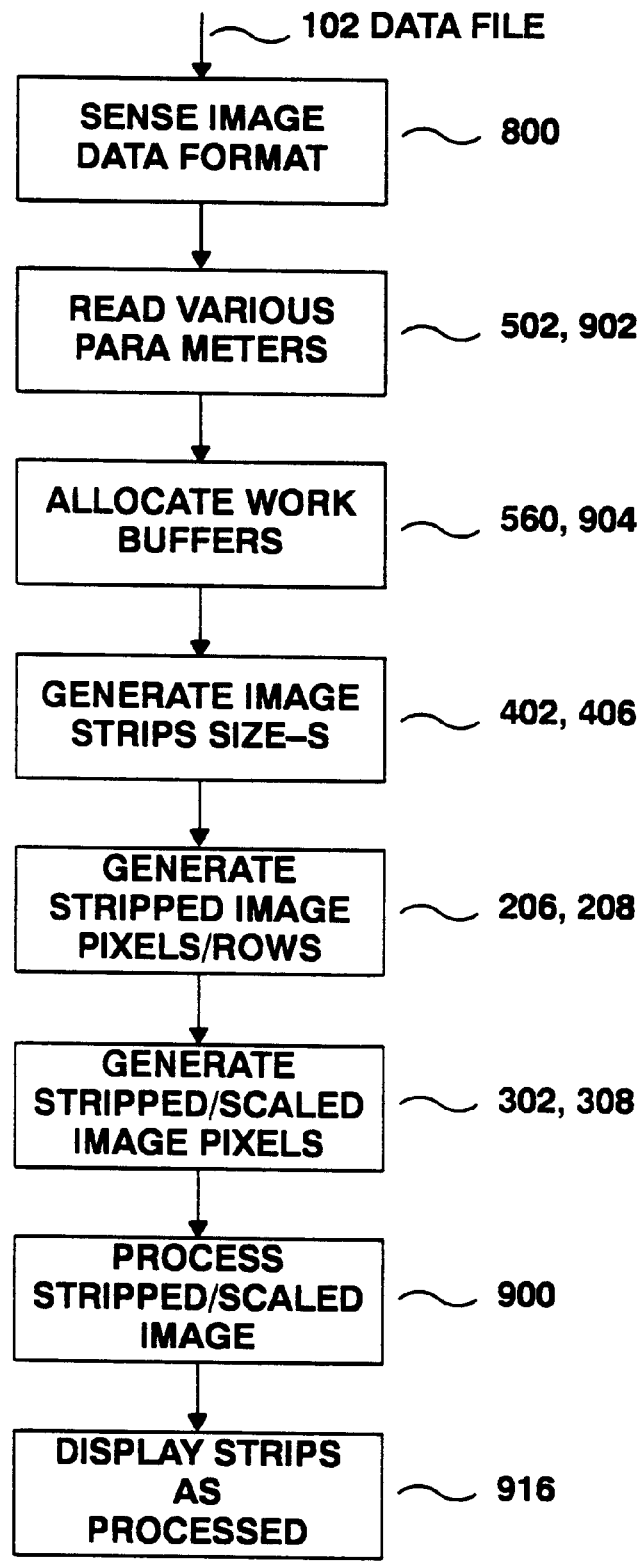
FIG. 9B is a basic system flow diagram illustrating steps employed by the computer to display processed strips.
Figure 20:
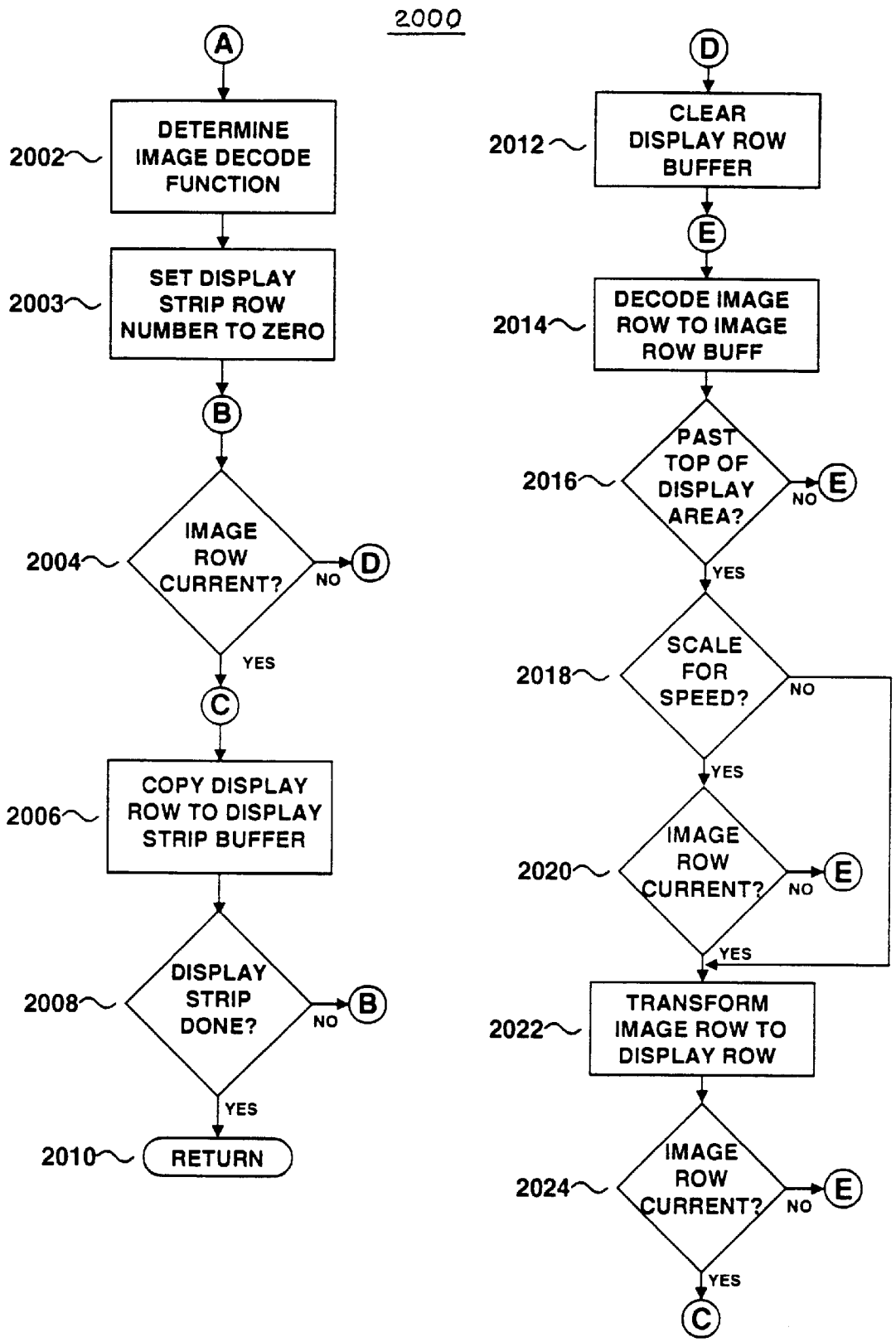
FIG. 20 is a flow chart illustrating an image strip decode and transformation process 2000, that converts an image data file into display strips, according to a preferred embodiment of the present invention.

Refer now to FIG. 9B showing a basic system flow diagram illustrating steps employed by computer 100 to display the processed strip 408 and is best understood when read in conjunction with FIGS. 9, 9A, and 20. The image format 802 in data file 102 is sensed at block 800. The image data structure contained therein is utilized at block 502,902 which numbers correspond to the same numbered structure shown in FIGS. 5 and 9. The information so read at block 502 enables the computer 100 to allocate work buffers to carry out the process 900 as shown at block 560,904. Thus, it is now possible to generate divided image strips 402 comprising rows of pixel image data as best shown at block 206,208. The rows of pixel images data 208 are scaled row by row to provide rows 308 of scaled pixel display information at the output of block 302,308. The rows of display pixels 308 are one pixel deep and finally processed in means 402 of computer 100 as strips to produce display image strip 408 at block 900. Strips numbered 1 through 5 comprise a stripped display image 404 which is presented on the display of computer 100 as a raster scan image in block 916.

FIG. 9B is intended to illustrate that image data files 102 are converted to image strips in pixel format, then scaled and processed as scaled image pixels for display as processed pixel data.

FIG. 14 is a block diagram illustrating scaling maps 1302 and 1304 for a sample image row 1402 of 1024 pixels and display row 1404 of 640 pixels. Scaling map 1406 is the image scaling map generated by evaluating function 1304 for each image pixel position in image row 1402. Scaling map 1408 is the scaling map generated by evaluating function 1308 for each display pixel position in display row 1404. For both scaling map examples, the image pick area size, $M_{PICK\ AREA}$, is assumed to be 512 pixels, the display area size, $M_{DISPLAY}$, is assumed to be 320 pixels, and the pick area upper left corner X coordinate, $X_{PICK\ AREA}$, is assumed to be at pixel 256.

This technique dramatically reduces the number of calculations required to scale each pixel of an image to the display area. For example, an original image 768×768 pixels being displayed on a screen (display device) which is 256×256 pixels would require a minimum of 65,536 scaling operations to be performed to display the image, 1 for each pixel in the display area. Each scaling operation would consist of a multiplication and a division operation similar to those shown each entry in the scaling map 1302 of FIG. 13. In the preferred embodiment the scaling operations for this example are performed only 768 times replacing 98.8% of the scaling operations with much quicker table lookup operations.

Figure 15:
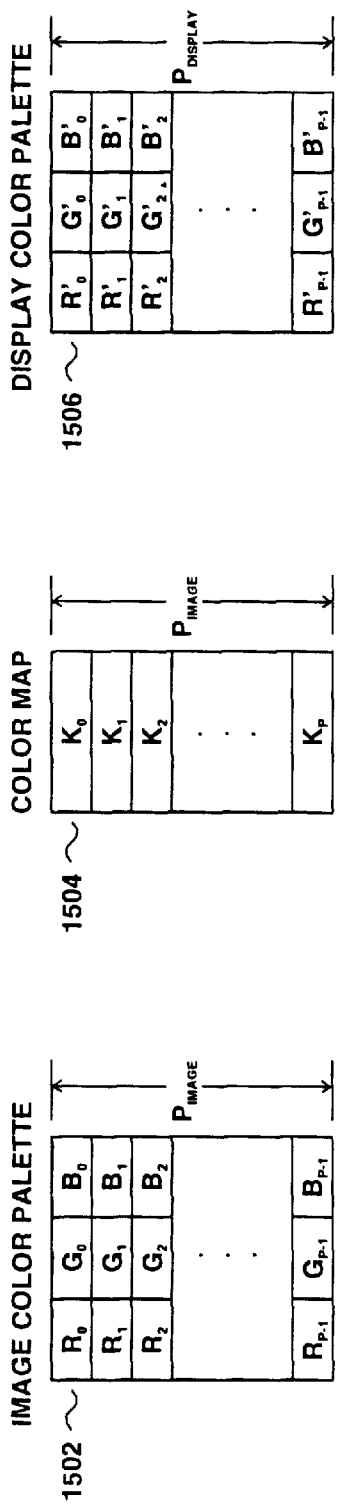
FIG. 15 is a block diagram illustrating example color mapping pixels according to a preferred embodiment of the present invention.

Referring to FIGS. 9 and 15, in step 908 a color map 1504 is generated and applied to pixel images to map color values in the image color palette 1502 to the appropriate color values for the display color palette 1506. Image color palette 1502 and display color palette 1506 are the color palettes 204 and 304 shown in FIGS. 2 and 3, and stored in palette buffer 1237 and display palette buffer 544, shown in FIG. 5. The values $K_0, K_1, \ldots K_P$, where $P=P_{IMAGE}$, are indices into the display palette buffer 1506. This mapping technique is understood by those skilled in the art. Step 908 is only performed for display devices requiring the use of color palette.

Next, referring to FIGS. 9 and 16, in step 910 display strips 1608 are generated from image data file 1602, ready to be displayed on the display device. Display strip 1608 is generated by reading code image data from image data file 1602, decoding the coded image data into image row 1604, transforming image row 1604 into display row 1606, and copying display row 1606 to display strip 1608 as needed. The image data is read from the data file 1602 and is scaled to the size required for display and any required color mapping is performed. A more detailed description of the strip generation process will be given immediately after the last step of process 900 is described.

Next, in step 912, display strips generated in step 910 are mirrored horizontally and/or vertically, as indicated by input parameter mirror flag 515 of FIG. 5. FIG. 17 is a block diagram illustrating the results of mirroring a display strip horizontally, vertically, and both horizontally and vertically. Display strip 1702 is a display strip generated in step 910 of FIG. 9. Display strips 1704, 1706, and 1708, are the image data from display strip 502 mirror horizontally only, vertically only, and both horizontally and vertically, respectfully. Mirroring techniques are understood by those skilled in the art.

Next, in step 914, after the display strips have been mirrored as required, they are rotated as indicated by input parameter rotation angle 514 of FIG. 5. FIG. 18 is a block diagram illustrating the results of rotating a display strip 90 degrees, 180 degrees, and 270 degrees. Display strip 1802 is a display strip generated in step 900, and possibly mirrored in step 912. Display strips 1804, 1806, and 1808, are the image data from display strip 1802 rotated 90 degrees, 180 degrees, and 270 degrees, respectfully. When the rotation operations are performed, the results are stored in rotation buffer 569. Rotation techniques are understood by those skilled in the art.

Figure 19:
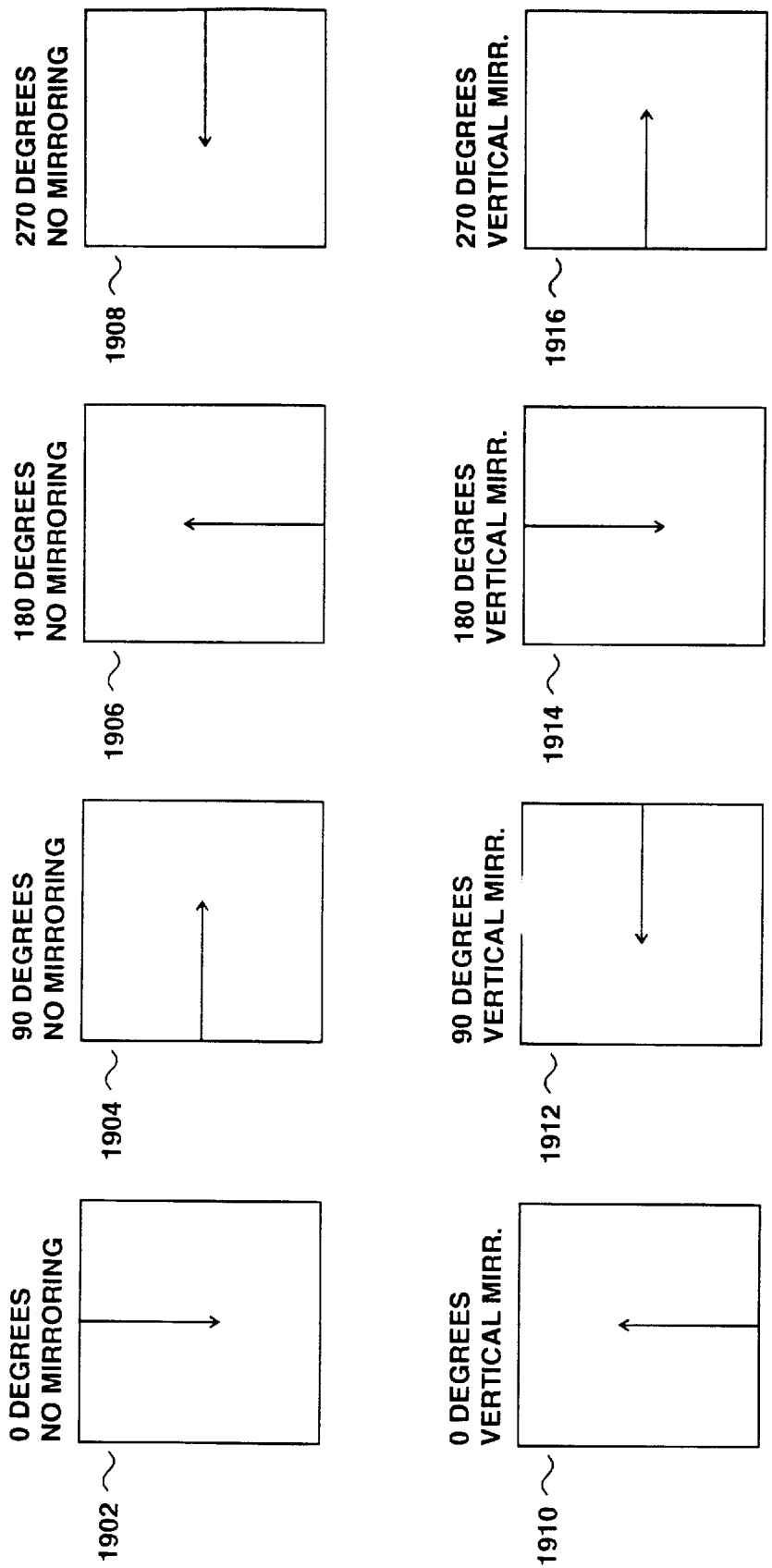
FIG. 19 is a block diagram illustrating display strip fill order according to a preferred embodiment of the present invention.

Next in step 916, after the display strips have been mirrored and rotated as required, they are ready to be copied to the display device. The display strips are copied to different locations, based upon a display strip fill order, as shown in FIG. 19. The display strip fill order is determined by the input parameters rotation angle 514 and mirror flag 515. For example, if rotation angle 514 is 0 degrees and mirror flag 515 is not set for vertical mirroring, then display strip fill order 1902, which fills the display device with display strips from top to bottom is used. However, if rotation angle 514 is 90 degrees and mirror flag 515 is set for vertical mirroring, then display strip fill order 1912, which fills the display device with display strips from right to left, is used.

The display strip is copied from either the display strip buffer 1202 or rotate buffer 1212, depending on if image parameter rotation angle 514 of FIG. 5. If rotation angle 514 is set to 0 degrees or 180 degrees, then the display strip buffer 1202 (also identified as display strip buffer 562 in FIG. 5) contains the display strip image data to be copied to the display device. If rotation angle 514 is set to 90 degrees or 270 degrees, then the rotate buffer 1212 (also identified as rotate buffer 569 in FIG. 5), which was set during step 914, contains the display strip image data to be copied to the display device.

Next, in step 918, a test is made to determine if there is any more display image strips to be generated. If there are more strips to be generated, then the process flow jumps back up to process step 910 and continues from there. Otherwise, the process flow continues with step 920.

In step 920, the work buffers, and any other resources, allocated for process 900 are deallocated. Additionally in step 920, computer data file 102 is closed.

Finally, in step 922, the display process is completed. Display image 302 is now displayed on the display device and computer system control is returned to the process invoking process 900.

Step 910 will now be described in more detail. FIG. 20 is a flow chart illustrating process 2000, that converts image data file 102 into display strips 308. A general overview of process 2000 will be given first, and then each individual step of process 2000 will described in more specific detail.

FIG. 16 is a block diagram illustrating basic data conversion process performed in process 2000. The process is iteratively performed as many times as necessary to generate a complete display strip 1608. Each iteration begins with the image data file 1602, which is equivalent to image data file 102 shown in FIG. 1. Image data file 1602 is encoded by a specific image format 802, shown in FIG. 8. The data shown in image data file 1602 is encoded using the ZSoft PCX/RLE encoding method. Image data file 1602 is decoded 1603, one image line at a time, into image row 1604, which is equivalent to image row 208, shown in FIG. 2. Image row 1604 is then optionally transformed 1605 into display row 1606, which is equivalent to display row 308, shown in FIG. 3, with scaling and color transformations. Image row 1604 may optionally be ignored if it is determined to have no effect on the generation of display strip 1608. The conditions under which this option available is based upon the input parameters pick area coordinates 521, display area coordinates 522, and vertical scaling type 518, shown in FIG. 5, and will be discussed in more detail shortly.

Once display row 1606 is generated, it is then repeatedly copied into display strip 1608 until one of the following conditions occurs; (1) display strip 1608 is completed, or (2) it is determined that a new display row 1606 is required. The first condition is controlled by the input parameter display strip size 517 shown in FIG. 5. When the number of display rows 1606 copied into display strip 1608 reaches the display strip size 517, process 2000 terminates and control return to the calling process (i.e. process 900 in this description). The second condition is controlled by the same input parameters which optionally allow image row 1604 to be ignored. These parameters and the conditions under which they occur will now be discussed in more detail.

Referring to FIGS. 6 and 7, two distinct vertical scaling situations may occur, based upon the number of image rows, $N_{PICK\ AREA}$, in pick area 604, and the number of display rows, $N_{DISPLAY\ AREA}$ in display area 704; (1) $N_{PICK\ AREA}$ is greater than $N_{DISPLAY\ AREA}$, or (2) $N_{PICK\ AREA}$ is less than or equal to $N_{DISPLAY\ AREA}$.

Figure 21:
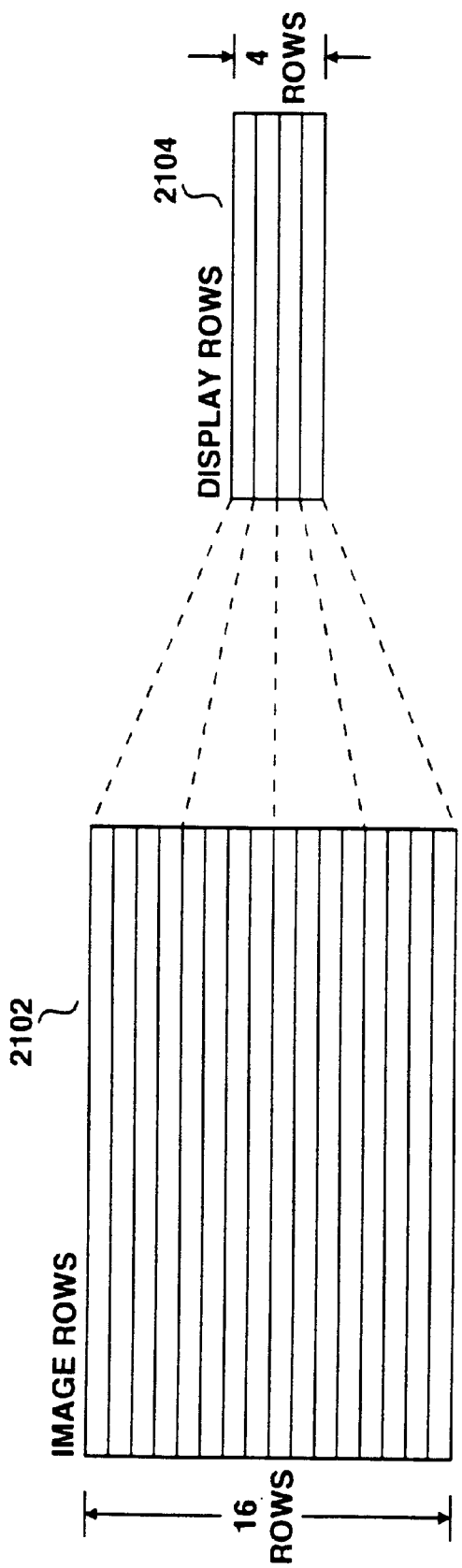
FIG. 21 is a general perspective illustrating a scaling down process according to a preferred embodiment of the present invention.

The first situation, illustrated in more detail in FIG. 21, is known as "scaling down". In this situation, there are more image rows in image 2102 than display rows in display image 2104. If a one-to-one mapping of image rows in image 2102 to display rows in display image 2104 is applied, it will leave several image rows in image 2102 as excess rows. Therefore, either multiple image rows in image 2102 will have to be combined into a single display row of display image 2104, or the excess image rows in image 2102 will have to be ignored. In the particular example shown in FIG. 21, either every 4 image rows of image 2102 will have to be combined into each successive display row of display image 2104, or three out of every four image rows of image 2102 will have to be ignored as excess image rows.

If this scaling down situation occurs, the input parameter vertical scaling type 518, shown in FIG. 5, defines which option will be taken by the display strip generation process. If the vertical scaling flag 518 is set to true, then when an image row 1604 is determined to be one of the excess image rows, the information in that image row 1604 is discarded and the next image row 1604 is decoded from image data file 1602. This scaling type is known as scaling for "speed", because it bypasses the scaling and color processes that transform image row 1604 into display row 1606, which reduces the amount of time required to generate display strip 1608.

If the vertical scaling type 518 is set to false, then every image row 1604, including all excess image rows, are transformed into display row 1606. Previous contents of display row 1606 are combined with newly transformed image rows 1604 as they are generated, so that no image information is discarded. This scaling type is known as scaling for "quality", because the amount of image information contained in the completed display strip 1608, is of much greater quality than if the excess image rows 1604 had been ignored.

Additionally, when this scaling down situation occurs and the vertical scaling type 518 is set to false, the display row 1606 is copied to the display strip 1608 only after all image rows 1604, including all excess image rows 1604, are transformed to display row 1606.

Figure 22:
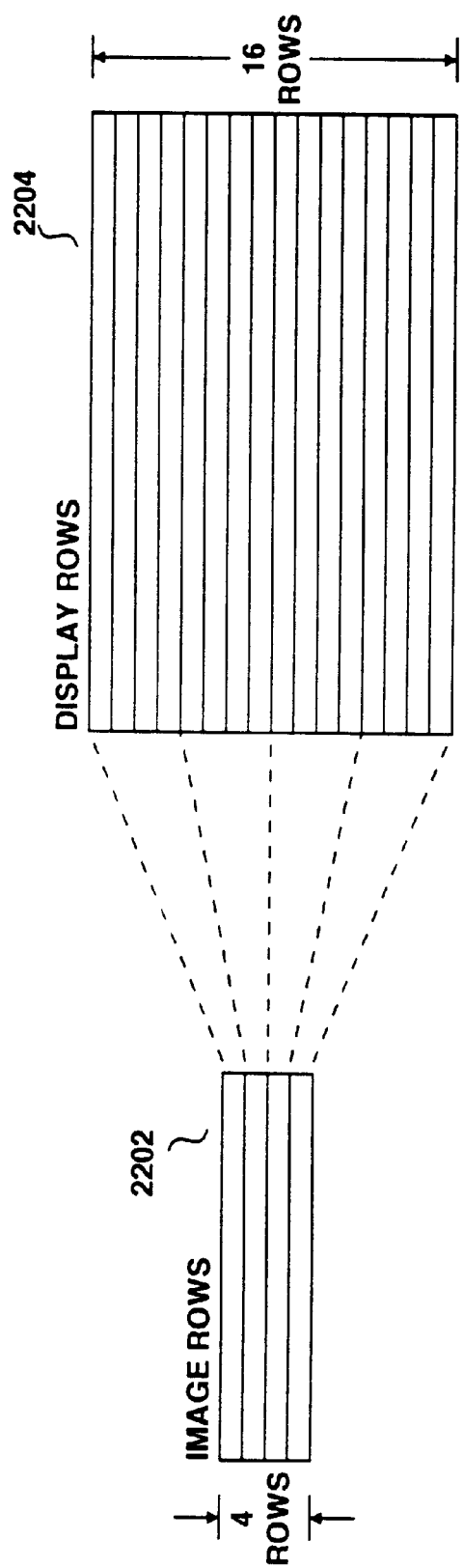
FIG. 22 is a general perspective illustrating a scaling up process according to a preferred embodiment of the present invention.
Figure 23:
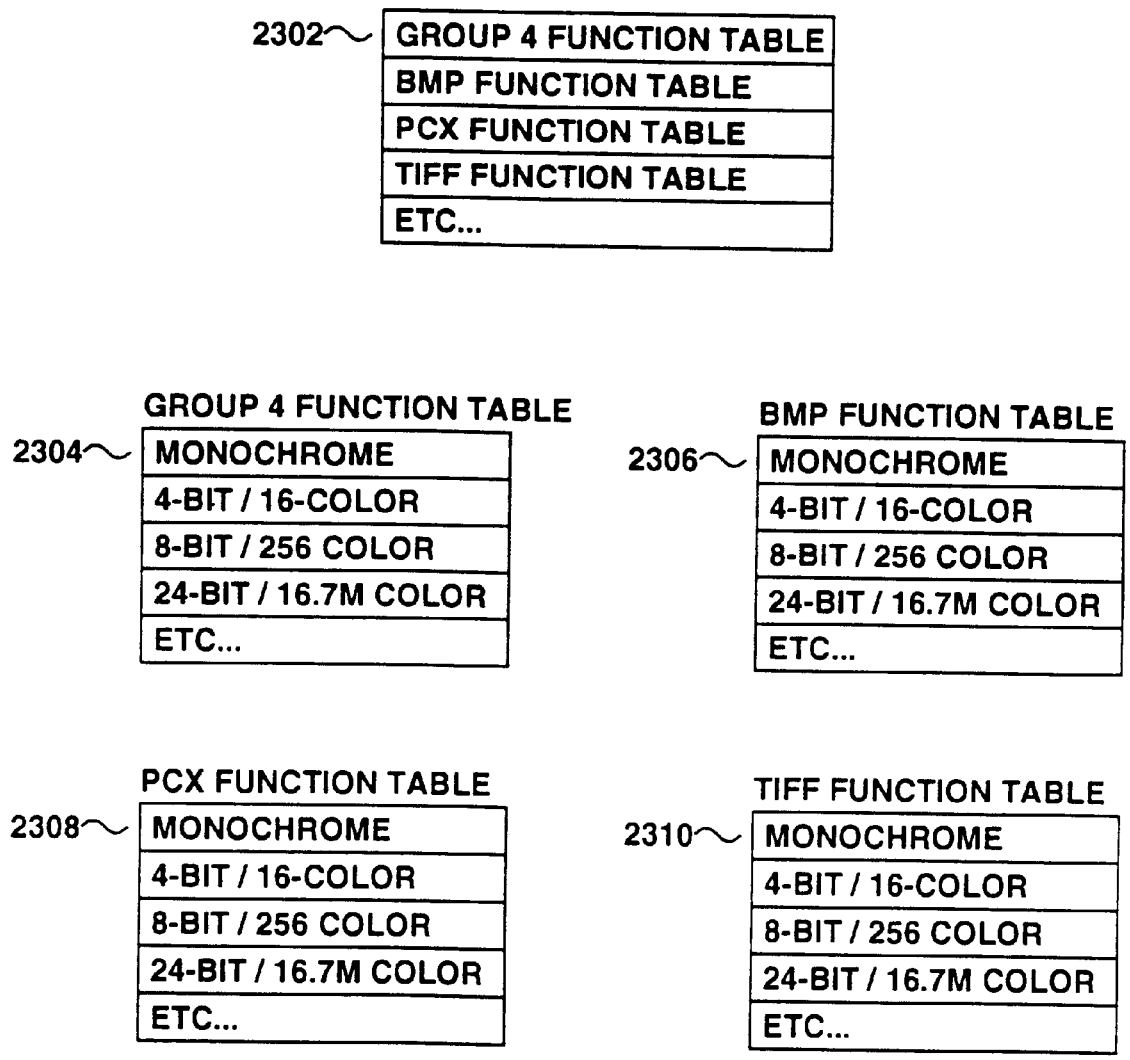
FIG. 23 illustrates a image minor format lookup table according to a preferred embodiment of the present invention.

Referring back to FIGS. 6, 7, and 16, the second situation, illustrated in more detail in FIG. 22, is known as "scaling up". In this situation, there are more display rows in display image 2204 than image rows in image 2202. Therefore, individual image rows in image 2202 must be replicated for multiple display rows in image 2204. In the particular example show in FIG. 22, every image row in image 2202 will have to be replicated to 4 display rows in display image 2204.

Additionally, when this scaling up situation occurs and the number of times a display row 1606 must be replicated, is not reached before or as the display strip 1608 is completed, the completed display strip 1608 is returned to the calling process, and the replication of the current contents of display row 1606 continues with the next display strip 1608 to be generated, immediately upon return to this process.

Referring back to FIGS. 16 and 20, process 2000 will now be described in more detail. Process 2000 consists of operational steps 2002–2038. Steps 2002–2010 represent the copying of display row 1606 to display strip 1608. Steps 2012–2020 represent the decoding of image data file 1602 to image row 1604. Steps 2022–2030 represent the transformation of image row 1604 to display row 1606, for monochrome image data. Steps 2032–2040 represent the transformation of image row 1604 to display row 1606, for color image data.

Referring to FIGS. 8, 9, 20, and 23, in step 2002 the image major format 804 and image minor format 806, determined in step 902 of FIG. 9, is used to identify a function to be used to retrieve image data from the data file 102. The image major format 804 is employed as an index into a lookup table 2302 to identify an image minor format lookup table 2304, 2306, 2308, 2310 all shown in FIG. 23. The image minor format lookup tables 2304–2310 are indexed by image minor format 806, to identify an appropriate function which will be used to decode image data in the data file. This function will be called upon in step 2014 each time a new image row is required for processing.

Next in step 2003, the display strip number is initialized 559 is initialized to zero.

Next, in step 2004, a test is performed to see if display row 1606 contains the image data required for the current display row number 554, shown in FIG. 5. The current value of display row number 554 is used to calculate the row number of the last image row to be mapped to the current display row. If the image row number calculated has not be decoded from image data file 1602 then the process flow jumps to step 2012 to decode image data into display row 1606. Otherwise, display row 1606 must have the correct image data for the next display row and the process flow can continue with step 2006.

In step 2006, display row 1606 is copied to the next display row of display strip 1608.

In step 2007 the display strip row number 559 is incremented by one.

Next, in step 2008, a test is performed to see if display strip 1606 is completed. The display strip row number 559 is compared to the display strip size 517. Display strip row number will always be less than or equal to display strip size 517. If display strip row number 559 is less than display strip size 517 then the display strip is not complete and the process flow jumps back to step 2004 for the next display row test. Otherwise, display strip size is complete.

Next in step 2010, a completed display strip 1608 is known to exist and process 2000 returns to the calling process.

In step 2012, display row 1606 is cleared in preparation for new display row image data from image data file 1602, through image row 1604. In the preferred embodiment of the present invention, clearing display row 1606 simply sets all values in display row 1606 to the default value, currently defined as the numeric value 0.

In step 2014, the decode function determined from the image format 802 in step 2002 is called to the next image row 1604 from the image data file 1602. The decode function is responsible for managing and decoding the image data file 1602 to image row 1604. Managing image data file 1602 includes any and all operations necessary to read and process the image data from image data file 1602. The decode function may use data file buffer 561 to store image data as required. Additionally, the decode function must automatically promote non-standard color bits image formats to the standard color bits image formats, as shown in FIG. 10 and as discussed earlier. Step 2014 assumes image row 1604 will contain the next row of image data when the decode function has returned. The operations required to decode image data are known by those skilled in the art and the reader is referred to the appropriate image format specifications for further information on these operations.

Next, in step 2015, the image row number 553 is increment by one.

In step 2016 a test is performed to see if the image row number for the image data in image row 1604 is outside the image pick area 604 shown in FIG. 6. The image row number is compared with the upper left corner y-coordinate value of image pick area 604, $Y_{PICK\ AREA}$. If the image row number is less than the y-coordinate value of image pick area 604 then the image information in image row 1604 is ignored and the process flow jumps back to step 2014 to get the next image row. Otherwise, the process flow continues to step 2018. Note that for the purposes of this test, image row number is one less than the actual value stored for image row number 553, because row number 553 was incremented in step 2015.

In step 2018, a test is performed to check that setting of scaling type flag 518. If the scaling type flag 518 is set to scale for quality then the process flow jumps to step 2022 to transforming image row 1604 to display row 1606. Otherwise, scaling type flag is assumed to be set to scale for speed and process flow continues to step 2020. A description of the meaning of scaling type flag and its possible values is given in the introduction to process 2000 above.

In step 2020, a test is performed to see if the image data in image row 1604 is an excess row and therefore can be ignored. The current value of display row number 554 is used to calculate the row number of the last image row to be mapped to the current display row. If the image row number calculated has not be decoded from image data file 1602 then the current image row is considered an excess image row and the process flow jumps back to step 2014 to decode the next row of image data into image row 1604. Otherwise, the image data in image row 1604 must be transformed into display row 1606 and the process flow continues on to step 2022.

Figure 24:
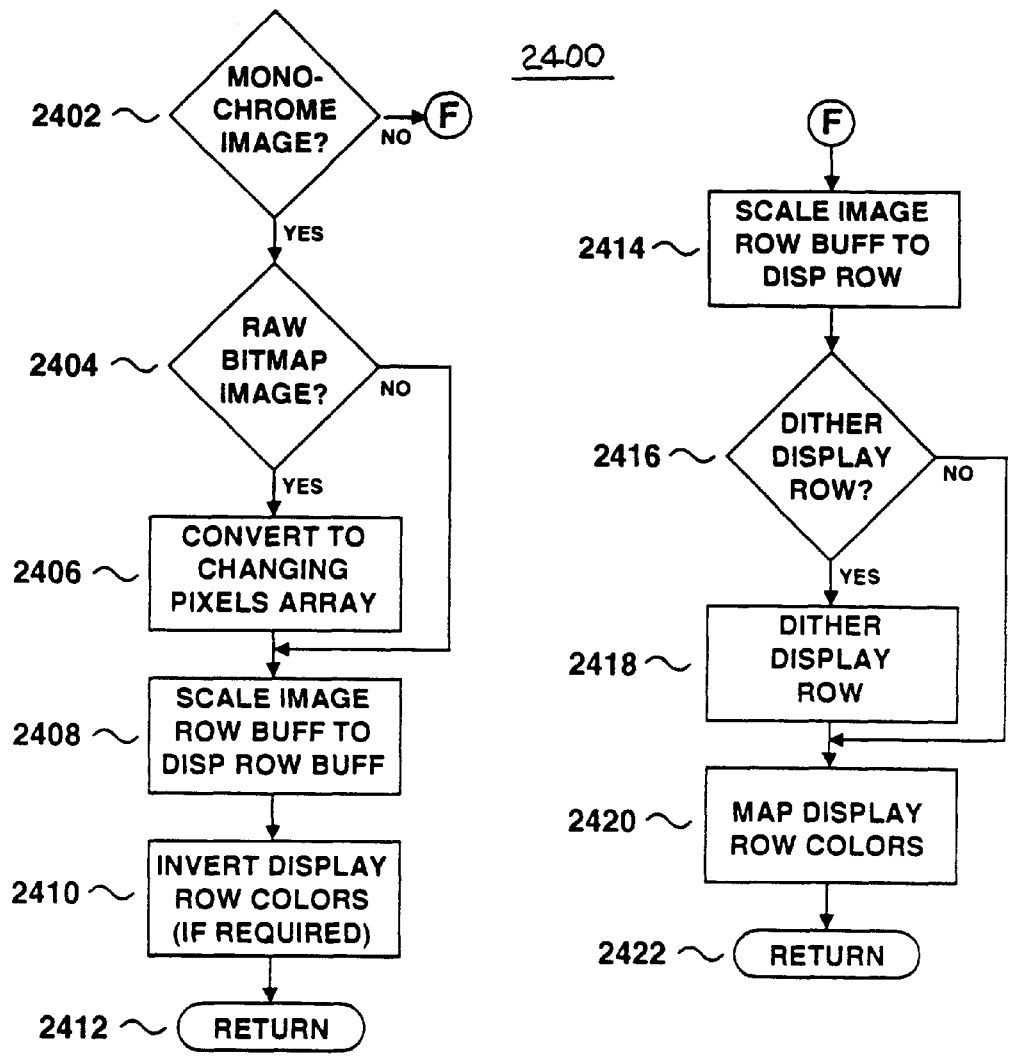
FIG. 24 is a flow chart illustrating the image row transformation process according to the preferred embodiment of the present invention.

In step 2022, image row 1604 is transformed into display row 1606. FIG. 24 is a flow chart illustrating the image row transformation process 2400 according to the preferred embodiment of the present invention. Process 2400 includes operational steps 2402–2422. Step 2402 determines whether processing for monochrome or color images is necessary. Steps 2404–2412 perform the transformation process for monochrome image rows. Steps 2414–2422 perform the transformation process for color image rows. Process 2400 will now be described in more detail.

In step 2402, a test is performed to check the format of the image data stored in image row 1604. The image color bits 557 is used to determine if image row 1604 contains monochrome image data or color image data. If image color bits 557 is greater than 1 then image row 1604 contains color image data and the process flow jumps to step 2414 to transform the color image data to display row 1606. Otherwise, image row 1604 contains monochrome image data and the process flow continues with step 2404.

In step 2404, a test is performed to see if the monochrome image data in image row 1604 is stored as a 1 bit/pixel form or as a changing pixels form. FIG. 25 is a block diagram illustrating the relationship between the 1 bit/pixel form and the changing pixels form. Each image row, 2502–2506, is the same monochrome image row expressed in three different forms. Image row 2502 is expressed in a standard 1 bit/pixel form, illustrating the monochrome color values of the image row at each individual pixel position. Image row 2504 is expressed in a standard 1 bit/pixel format, and numerically represented in groups of 8 pixels, as individual 8-bit hexadecimal values. Image row 2506 is expressed in a changing pixels form.

Changing pixels form is a method of storing a row of image data as a series of numbers representing successive occurrences of changing pixels from the start of the image row. A changing pixel is a pixel where the pixel color value of the pixel is different from the color value of the pixel it follows. For example, in image row 2502, the pixel at offset 3 is black and the pixel at offset 4 is white. Therefore, the pixel at offset 4 is a changing pixel. By definition, the color value of the pixel immediately preceding the first pixel the image row is a default pixel color value. For image row 2502, the default pixel color value is white. The concept of changing pixels is derived from the image data encoding method used to encode monochrome image data with the CCITT Group 4 image format specification.

By representing monochrome image rows as an array of changing pixel positions, the location and size of consecutive same color pixel value runs can be easily be determined. Referring to FIG. 25, using the image row 2506, the row of image data can easily be described as a run of 0 white pixels starting at pixel position 0, 4 black pixels starting at pixel position 0, 2 white pixels starting at pixel position 4, 2 black pixels starting at pixel position 6, and so forth. By representing monochrome image data in a changing pixel form, the inherent ability of computer systems to process individual bytes of data faster than they can individual bits of data can be exploited to increase overall process performance.

Referring back to FIG. 24 step 2404, the image format 802 shown in FIG. 8 is used to determined the storage form for image row 1604. If image format 802 indicates the monochrome image data was stored in the image data file 1602 as CCITT Group 4 encoded data then image row 1604 is assumed to be in changing pixels form, and the process flow jumps to step 2408. Otherwise, image row 1604 is assumed to be expressed in a standard monochrome 1 bit/pixel form and must be converted to a changing pixels form.

Figure 26:
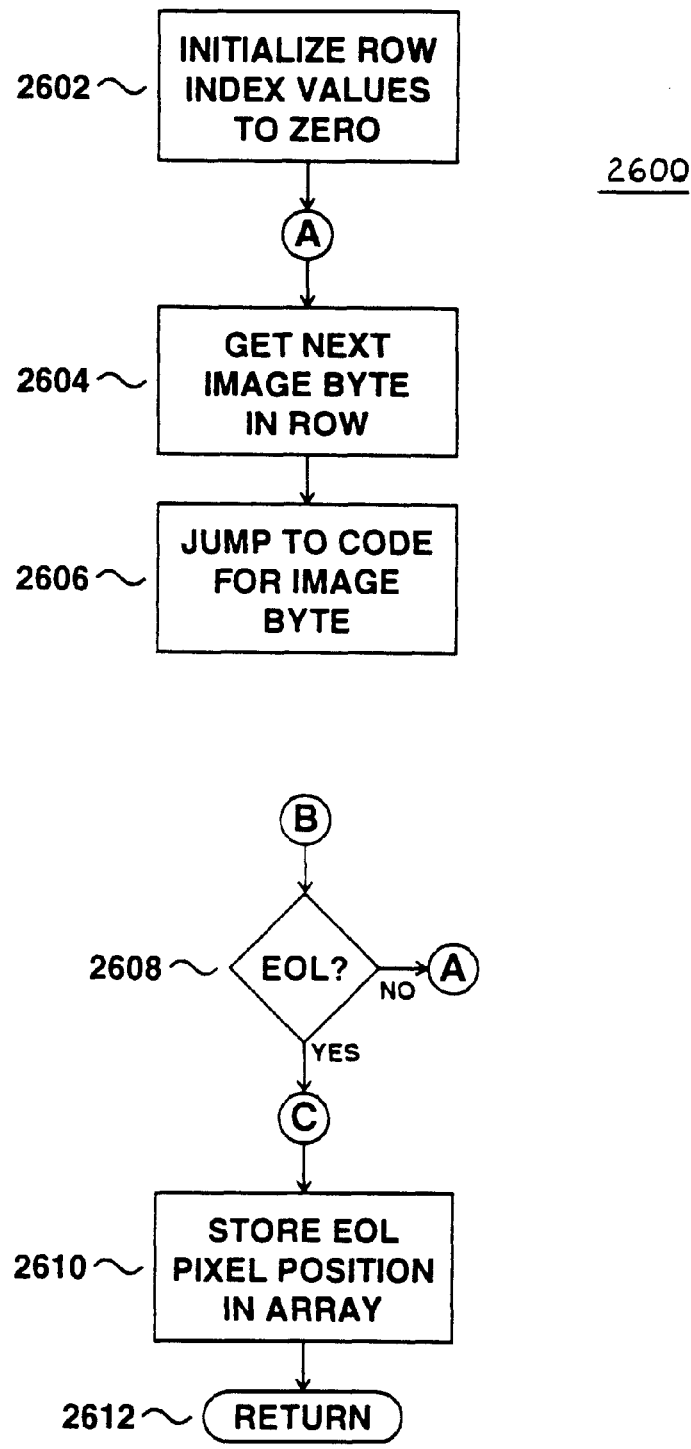
FIG. 26 is a flow chart illustrating a changing pixels conversion process for converting 1 bit/pixel image rows to changing pixel image rows, according to a preferred embodiment of the present invention.

In step 2406, image row 1604 is converted from a 1 bit/pixel form to a changing pixels form. FIG. 26 is a flow chart illustrating a changing pixels conversion process 2600, for converting 1 bit/pixel image rows to changing pixel image rows. Process 2600 includes operational steps 2602–2612, which will now be described in more detail.

Referring to FIGS. 25 and 26, in step 2602 the next pixel position 2508 and next array entry 2512 values are initialized to zero. The next pixel position 2508 value is the offset, into image row 2502, of the next pixel to be converted to image row 2506. The next array entry 2512 value is the offset, into image row 2606, of the next changing pixel value to be stored.

In step 2604, the next pixel position 2508 is used to calculate the next image byte 2512 offset into image row 2504. The next image byte 2512 is the next byte of image data to be converted to image row 2506. The offset of the next image byte 2512 is calculated by dividing the next pixel position 2508 by 8. The first data bit of the next image byte 2512 will always equal the data bit at the next pixel position 2508 because image data is converted to image row 2506 from image rows 2502 and 2504 in groups of 8 data bits.

Referring to FIGS. 26 and 27, in step 2606, the next image byte 2512 is used as a table index 2704, into either zero-bit process segment table 2706 or one-bit process segment table 2708, to determine the next step to be executed in process 2600. Each entry in segment table 2706 and segment 2708 is the label of a segment of process steps that encode the image byte value it represents into changing pixels values. The value of previous bit 2702 determines whether segment table 2706 or segment table 2708 will be used. Previous bit 2702 is the bit value of the last pixel of the last value of next image byte 2512. If next image byte 2512 is the first image byte in image row 2504 then previous bit 2702 is defined to be zero.

The process section labels in segment table 2706 and segment table 2708 are designed to reflect the nature of the image byte 2704 it is responsible for converting. Each label consists of 2 parts; a value transition indicator and a bit run-length pattern value. The value transition indicator is either "NT", for non-transitional, or "TR", for transitional. A value transition indicator of "NT" means the process segment begins with the assumption that the previous pixel 2702 of the previous image byte 2704 is the same value as the first pixel of the current image byte 2704, (i.e. there is not a transition from one-to-zero or zero-to-one). A value transition indicator of "TR" means the process segment begins with the assumption that the previous pixel 2702 of the previous byte is not the same value as the first pixel of the current image byte 2704, (i.e. a transition occurs). The bit run-length pattern value is a 1 to 8 digit number indicating the run-lengths of the pixels with image byte 2704. For example, 8 means a run-length of 8 pixels of the same color, 512 means a run-length of 5 pixels of one color, 1 pixels of the other, and 2 pixels of the first color.

There is a naturally occurring symmetry in process segment tables 2706 and 2708 which is due to the pixel run-length patterns found in the numeric representation of the image bytes 2704. Each table 2706 and 2708 consists of 256 entries, one for each of the 256 possible values for image byte 2704. However, using the bit run-length notation, there are only 128 distinct bit run-length patterns possible. After the first 128 bit run-length patters are generated for the first 128 entries of the tables 2706 and 2708 (e.g. 8, 71, 611, 62, etc.), they are repeated in the second 128 entries, in the reverse order they occurred in the first 128 entries. The only difference is the bit run-lengths in the first 128 entries represent the opposition bit values, or colors, then the bit run-lengths in the second 128 entries. Each entry in tables 2706 and 2708 with a transition indicator of NT has a corresponding entry with a transition indicator of TR with the same bit run-length value.

Figure 28:
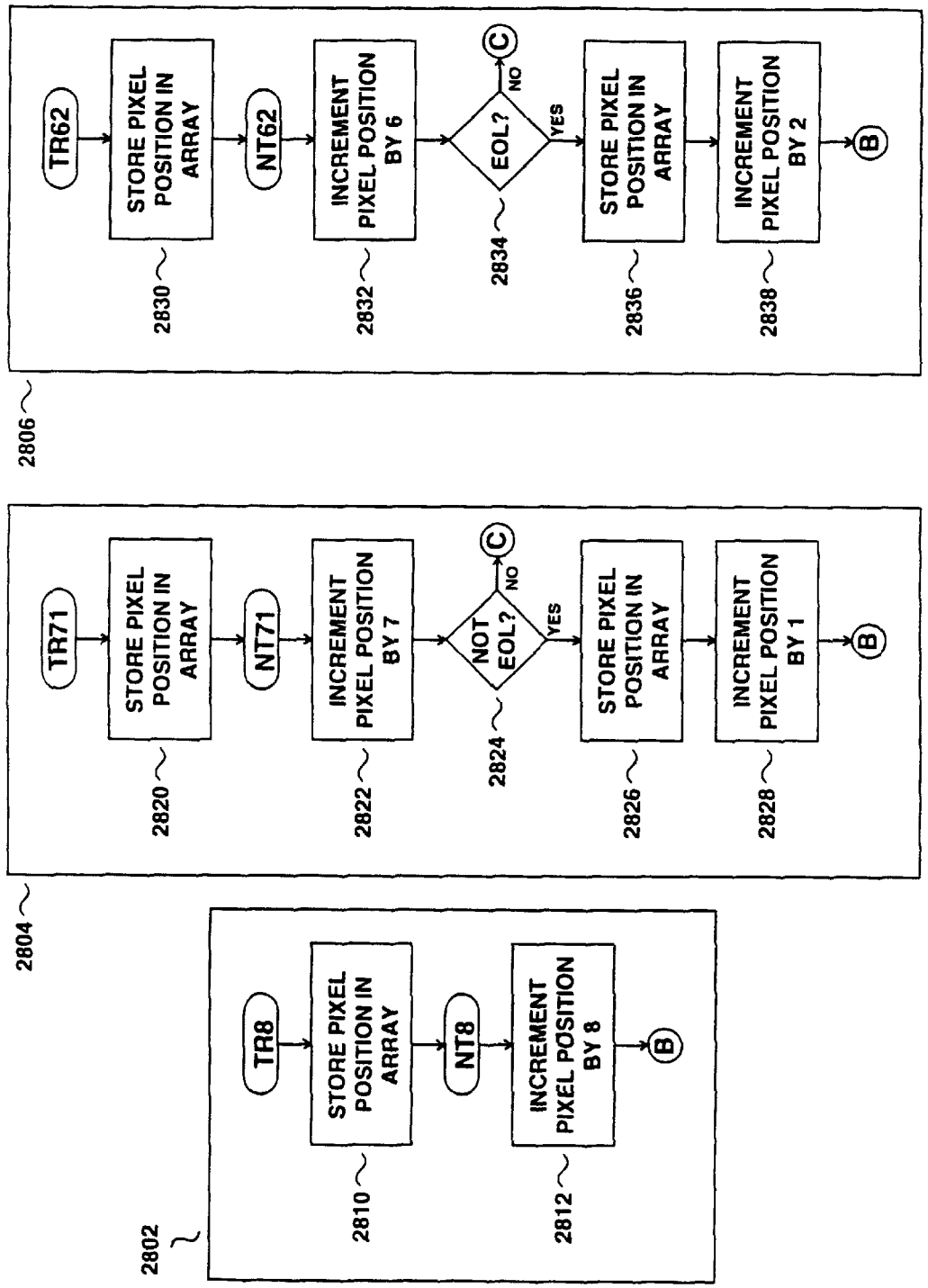
FIG. 28 is a set of three flow charts, 2802–2806, illustrating six of the process segments referenced in segment tables of FIG. 27.

FIG. 28 is a set of 3 flow charts, 2802–2806, illustrating 6 of the process segments referenced in segment tables 2706 and 2708. Each flow chart 2802–2806 represents both the transitional and non-transitional process segments for a single image byte 2704. Flow chart 2802, consisting of process steps, 2810–2812, illustrates the process segments TR8 and NT8. Flow chart 2804, consisting of process steps 2820–2828, illustrates the process segments TR71 and NT71. Flow chart 2806, consisting of process steps 2830–2838, illustrates the process steps TR62 and NT62. The process steps for the remaining 125 process segments referenced in segment tables 2706 and 2708 are constructed in a similar manner and will not be described in any further detail. The process steps for flow charts 2802–2806 will now be discussed in more detail.

Referring to FIGS. 25, 27, and 28, in step 2810, the first process step for process segment TR8, the value of next pixel position 2508 is stored in image row 2506 and the next array entry 2514 is moved to the next entry of image row 2506. When this step is executed, it is known that previous bit 2702 is a different value than the first data bit of image byte 2702. This means that the pixel represented byte the first data bit of image byte 2702 is a changing pixel, and the position of that pixel must be stored in image row 2506.

Next, in step 2812, the next pixel position value is increment by 8, the length of the next run of same value pixels. The next pixel position 2508 is be increment by 8 pixels because the next 8 pixels of image byte 2704 are known to be all of the same value. Even if the actual run length of same color bits in the image row at this point is greater than 8 bits long, only 8 of the bits are known to exist at this point and the additional bits are addressed during the next process segment for that value of image byte 2514. The process flow then jumps to step 2608 on FIG. 26 to prepare for the next image byte 2512.

Flow chart 2802 also illustrates a common relationship between corresponding transitional and non-transitional process segments, found in all of the process segment flow charts 2802–2806. In all cases, the transitional process segments consists of the exact same process steps as the non-transitional process segments, preceded by a process step that stores the next pixel position as a changing pixel position. For example, in flow chart 2802, the transitional process segment TR8 consists of steps 2810 and 2812, and the non-transitional process segment NT8 consists of process step 2812. Each process segment low chart will follow the same basic pattern.

Steps 2820–2828 are the process steps for process segments TR71 and NT71. In step 2820 a changing pixel is known to exist, the value of next pixel position 2808 is stored in image row 2506, and the next array entry 2514 is increment to the next entry in image row 2506. In step 2822, the next pixel position 2508 in increment by 7, the length of the next run of same value pixels. In step 2824 a test is performed to see if the next pixel position 2508 is past the end of line pixel position 2510. If it is then the process flow jumps to step 2610 of FIG. 26. Otherwise, the process flow continues on with step 2826. In step 2826, a changing pixel is known to exist, so the value of next pixel position 2508 is stored in image row 2506, and the next array entry 2514 is incremented to the next entry in image row 2506. In step 2828, the next pixel position 2508 is increment by 1, the length of the next run of sample value pixels. The process flow then jumps back to step 2608 on FIG. 26 to prepare for the next image byte 2512.

Steps 2830 to 2838 are the process steps for process segments TR62 and NT62. The steps are identical to process steps 2820–2828 for process segments TR71 and NT71, except the increment values in steps 2832 and 2838 are different.

Each process segment such as those illustrated in FIG. 28, eventually jumps to either step 2608 or step 2610 of FIG. 26 after the process segment steps are completed. In step 2608, a test is performed to see if the next pixel position 2508 is past the end of line pixel position 2510. This test is the same test performed during the process segment flow chart steps 2824 and 2834. If it is not then the process flow jumps back to step 2604 to process the next image byte of image row 2504. Otherwise, the process flow continues on with step 2610.

In step 2610, the end of line pixel position 2510 is stored 3 consecutive times in image row 2506 to indicate the end of the last run of pixels. The extra end of line pixel position values in image row 2506 will be used later in the scaling algorithms to signal the end of a row of image data.

Finally in step 2612, the process flow returns to the process invoking process 2600. In the case of this description this is step 2406 of FIG. 24.

Figure 29:
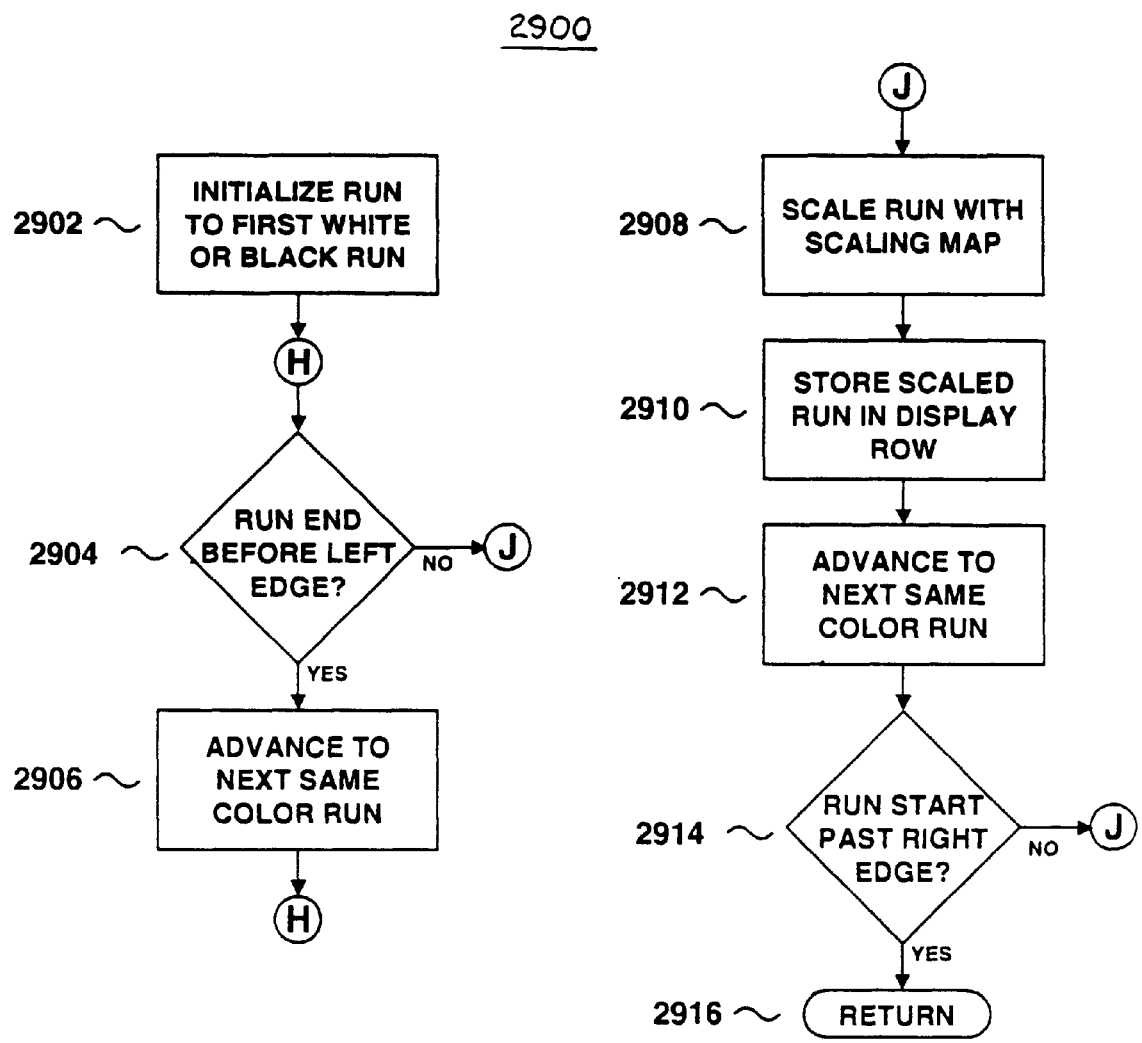
FIG. 29 is a flow chart illustrating a scaling process for scaling changing pixel rows to 1 bit/pixel image rows, according to a preferred embodiment of the present invention.

Referring to FIGS. 16, 24, and 29, in step 2408, image row 1604 is scaled to image row 1606, using process 2900. FIG. 29 is a flow chart illustrating a scaling process 2900 for scaling changing pixel rows to 1 bit/pixel image rows. Process 2900 consists of steps 2902–2916. Steps 2902–2906 represent initialization of process 2900. Steps 2908–2916 represent the scaling operations performed by process 2900. Process 2900 will now be described in more detail.

Referring to FIGS. 5, 29, and 30, in step 2902 the current run 3016 is initialized to the first run of either white run set 3012 or black run set 3014. Pixel runs in white run set 3012 all begin at pixel runs where the pixel turns to white from black. Pixel runs in black run set 3014 all being at pixel runs where the pixel turns to black from white. The inverse image colors flag 512 is used to determined which run set 3012 or 3014 will be used in scaling process 2900. If the inverse image color flag 512 is set to true then the white run set 3012 is used, otherwise, the black run set 3014 is used.

In step 2904, a test is performed to see if the current run 3016 ends before the left edge of the image pick area 3026. In the example shown in FIG. 30, the pick area left edge 3026 is the first pixel of image row 3024. If the current run end value 3020 is greater than or equal to the pick area left edge 3026 then it is the first run that needs to be scaled, and the process flow jumps to step 2908 to being the main scaling process. Otherwise, the process flow continues to step 2906.

In step 2906, the current run 3016 is advanced to the next same color pixel run, which is the pair of changing pixel immediately following the current run 3016. The process flow the jumps back to step 2904.

In step 2908, the current run 3016 is scaled to the current scaled run 3030. Referring to FIGS. 30 and 31, scaling map 3004 is an example scaling map generated to scale image row 3002, which consists of 32 pixels, to image rows 3102 and 3104, which each of 16 pixels. The current pixel run 3016 is scaled by individually scaling the run start 3018 to the scaled run start 3032 and run end 3020 to the scaled run end 3034. The run values 3018 and 3020 are used as indices into scaling map 3004, and assigning the value of scaling map at those indices as the scaled run values 3032 and 3034. Image row 3006 illustrates the results of applying scaling map 3004 to each changing pixel value in image row 3002.

Note that in the preferred embodiment of the present invention, image row 3006 is never actually generated and stored in a data buffer. Each current run 3016 is individually scaled with scaling map 3004 and the scaled run 3030 values maintained in processor registers until they are used later in step 2910. After step 2910 the values are discarded. Image row 3006 is shown in FIG. 30 for illustration purposes only.

Next, in step 2910, referring to FIGS. 29, 30, and 31, the current scaled run 3030 is converted to 1 bit/pixel form and stored in image row 3102. The current scaled run 3030 specifies the run start pixel 3032 and the run end pixel 3034. The length of the run is calculated by subtracting the run start pixel 3032 from the run end pixel 3034. If a length of 0 results from the calculation then a default run length of 1 pixel is assumed. For example, in FIG. 30, current scaled run 3030 has a start run value 3032 of 9 and an end run value 3034 of 9. The length of current scaled run 3030 would be calculated as 0, a pixel run of length 1 is stored in image row 3102.

Next, in step 2912, the current run 3016 is advanced to the next same color pixel run.

In step 2914 a test is performed to see if the current run 3016 has reached the run start 3018 of the current run 3016 is past the pick area right edge 3028.

In step 2914, a test is performed to see if the current run 3016 starts after the right edge of the image pick area 3028. In the example shown in FIG. 30, the pick area right edge 3028 is the last pixel of image row 3024. If the current run start value 3020 is less than or equal to the pick area right edge 3028 then the current run 3016 needs to be scaled, and the process flow jumps back to step 2908 to continue the main scaling process. Otherwise, the process flow continues to step 2916.

In step 2916 the process flow returns to the process invoking process 2900. In the case of this description this is step 2410 of FIG. 24.

In step 2410, if required, the bits in display row 1606 are inverted. There are 2 input parameters that determine if display row 1606 must be inverted; inverse image colors flag 512 and inverse display colors flag 513. If either flag is set to true and the other flag is set to false (i.e. logical exclusive "or"), the pixels in display row 1606 must be inverted so they will appear visually correct on the display device. The inversion process is a simple translation table process that replaces each byte in display row 1606 with it one's complement.

Next in step 2412 the process flow returns to the process invoking process 2400. In the case of this description this is step 2024 of FIG. 20.

Steps 2414–2422 of process 2400, which perform the transformation process for color image rows, will now be described.

Referring to FIGS. 24 and 16, in step 2414, image row 1604 is scaled to display row 1606. Display scaling map 1306 (shown in FIG. 13) generated during step 906 of process 900 (shown in FIG. 9) is used to map image pixel positions in image row 1604 to display pixel positions in display row 1606. The color for each display pixel in display row 1606 is set to the color of the image pixel in image row 1604 to which it maps through the display scaling map 1306.

The display pixel offset from the start of display row 1606 is used as an index into scaling map 1306, to determine the offset of the image pixel in image row 1604.

Next, in step 2416, the dither required flag 551, determined in step 902 of FIG. 9, and the dither allowed flag 516, provided as an input parameter, are used to determine if display row 1606 needs to be dithered to the current color palette. If both the dither required flag 551 and the dither allowed flag are set to true then dithering needs to be performed and the process flow continues to step 2418. Otherwise, the display row 1606 does not need to be dithered and the process flow skips to step 2420.

In step 2418, display row 1606 is dither to a predefined color palette. Dithering is an industry standard method of simulating the appearance of large number of colors using a fixed or limited number of colors. Process 2400 employs Bayer dithering techniques to dither display row 1606 to predefined fixed value 16 and 256 color palettes. Bayer dithering is known by those skilled in the art and will not be discussed here. The dithering techniques using the following parameters defined in image data structure 502, shown in FIG. 5; image width 532, display area coordinates 522, palette size 536, palette buffer 537, display palette size 543, and display palette buffer 544.

In step 2420, if required, the color values in display row 1606 are mapped to the appropriate display palette values. Color map 1504 (shown in FIG. 15) generated in step 908 of process 900 (shown in FIG. 9) is used as a color value translation table. Each color value in display row 1606 is used as an index into the color map 1504 to determine the new color value for that pixel position.

Some graphical user interface environments, such as Microsoft Windows, have this capability built into their interface routines, and for those environment, this step can be ignored. For those environments, the color map 1504 is sent directly to the graphical user interface when it is generated in step 908 and the color values in display row 1606 are translated by the environment as they are transferred to the display device.

In step 2422, the transformation of image row 1604 to display row 1606 is completed and the process flow returns to the process invoking process 2400. In the case of this description this is step 2024 of FIG. 20.

Referring to FIG. 20, in step 2024, a test is performed to see if the image data in image row 1606 contains all of the image row data which is to be mapped to the current display row. The current value of display row number 554 is used to calculate the row number of the last image row to be mapped to the current display row. If the image row number calculated has not be decoded from image data file 1602 then the process flow jumps back to step 2014 to decode the next row of image data into image row 1604. Otherwise, the image data in image row 1604 is considered completed and the process flow jumps back to step 2006 to copy the row to the display strip buffer 562.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A process for rapidly decoding and displaying formatted original raster images on a computer display device with negligible delay time, comprising the steps of:

receiving a self contained stream of formatted digital scan line data at the computer comprising a raster image to be displayed on a display;

reading image input parameters contained in said stream of scan line data to enable the computer to format the scan line data into an original pixel image;

decoding and dividing the raster image into a number of fixed sized strips S of scan lines of pixel data wherein each pixel is defined by said image input parameters;

generating an original pixel image as a plurality of pixel image rows from said fixed size strips of data in said computer;

storing pixel image rows in the form of said fixed sized strips in a memory in said computer, generating a scaling map in said computer which relates the pixel positions of said fixed sized strips of pixel image rows with actual pixel positions of said computer display device;

processing each of said fixed sized strips of pixel image rows individually using said scaling map to expand or shrink each of said fixed sized strips to predetermined display scan lines of an image of pixels compatible with said display device; and displaying each of said decoded scaled and processed fixed sized pixel image strips as they are processed as pixel display scan lines on said display device of said computer immediately after said scaled strips are individually processed.

2. The process of claim 1 wherein the step of using said scaling map to scale each of said fixed sized strips to individual display scan lines as each pixel image rows of said strips is bypassed without scaling whereby redundant processing calculations are avoided.

3. The process of claim 1 further comprising the step of performing color transformations, including rounding up the color-bits-per pixel to align with byte boundaries for faster access, as said fixed sized strips are initially decoded.

4. The process of claim 1 further comprising the step of detecting scan lines of data in the raster image which do not affect the final display image and terminating further processing of those scan lines of data which do not affect the final display image.

5. The process of claim 1 further comprising the step of implementing said processing step using assembly language instructions to maximize speed of the process.

6. A system for rapidly decoding and displaying formatted raster images on a display device of a computer with negligible delay time, comprising:

means for receiving a preformatted raster image data file comprising scan line data in said computer;

means for decoding and formatted said scan line data to provide an original pixel image in the memory of said computer, means for dividing said original pixel image into fixed sized strips of lines of pixel image data;

means for decoding and processing each of said fixed sized strips of line of pixel image data individually to provide pixel image strips of rows compatible with said display device;

scaling map means for converting said strips of of lines of pixel image data to pixel display image rows of strips ready for display on said display device; and means for displaying each of said pixel display image rows of strips as processed on said display device immediately after said strips are individually converted and processed.

7. The system of claim 6 further comprising means for generating said scaling map before any strips are processed and means for bypassing the use of said scaling map means to scale each of said fixed sized strips, whereby redundant scaling and processing calculations are avoided.

8. The system of claim 6 further comprising the step of performing color transformations, including rounding up the color-bits-per pixel to align with byte boundaries for faster access, as said fixed sized strips are initially decoded.

9. The system of claim 6 further comprising means for detecting scan lines of data in the raster image which do not affect the final display image or are not to be displayed in the final display image and means for terminating further processing of those scan lines of data which do not affect the final display image.

10. The system of claim 6 further comprising means for implementing said processing step using assembly language instructions to maximize speed of the process.

11. Apparatus for decoding and displaying formatted digital scan line data which defines raster scan line images on a display device as a continuous real time operation, comprising:

computer means for receiving said formatted digital scan line data;

means for dividing the original raster image into N fixed sized strips of scan line data, where N is an integer greater than 1;

means for decoding and converting said scan line data into fixed size strips of pixel image data capable of being displayed;

means for processing each of the fixed sized strips of pixel image data individually, where said processing may comprise the step of scaling, color transforming, rotating, and mirroring for a known display; and means for displaying the processed strips of pixel image data in said known display device immediately after said strips are individually processed.

12. The apparatus of claim 11 wherein said digital scan line data has been encoded using a known standard image encoding format to represent said raster images.

13. Apparatus for displaying formatted original raster images on a display of a personal computer as they are received in a standard coded format, comprising:

means for receiving a coded raster image as a stream of scan line data, means for decoding said stream of scan line data and input parameters contained therein, means for dividing said scan line data into strips of an image to be processed, means for converting the strips of scan line data to strips of pixel image data in a format for display, means for scaling said strips of pixel image data to strips of scaled rows of pixel image data for a full line on said display, processing means for processing said scaled rows of said pixel image data, and display means for displaying full lines of said processed pixel image data on said display of a personal computer.

14. Apparatus as set forth in claim 13 wherein said personal computer further comprises memory means for storing original raster images in compressed standard coded image format.

15. Apparatus as set forth in claim 14 wherein said personal computer further comprises, means for receiving and identifying a plurality of different industry standard coded image formats for display as full lines on said display.

* * * * *